(12) United States Patent
Ozawa

(10) Patent No.: US 8,855,123 B2
(45) Date of Patent: Oct. 7, 2014

(54) GATEWAY APPARATUS, METHOD AND SYSTEM

(75) Inventor: Kazunori Ozawa, Tokyo (JP)

(73) Assignee: NEC Corporation, Tokyo (JP)

( * ) Notice: Subject to any disclaimer, the term of this patent is extended or adjusted under 35 U.S.C. 154(b) by 228 days.

(21) Appl. No.: 13/143,140

(22) PCT Filed: Jan. 6, 2010

(86) PCT No.: PCT/JP2010/050046
§ 371 (c)(1),
(2), (4) Date: Jul. 1, 2011

(87) PCT Pub. No.: WO2010/079789
PCT Pub. Date: Jul. 15, 2010

(65) Prior Publication Data
US 2011/0274116 A1    Nov. 10, 2011

(30) Foreign Application Priority Data

Jan. 9, 2009 (JP) ................................ 2009-004047
Jan. 9, 2009 (JP) ................................ 2009-004049

(51) Int. Cl.
*H04L 12/66* (2006.01)
*H04M 7/12* (2006.01)
*H04L 12/64* (2006.01)
*H04W 36/02* (2009.01)
*H04W 88/16* (2009.01)

(52) U.S. Cl.
CPC ............ *H04L 12/66* (2013.01); *H04W 36/023* (2013.01); *H04W 88/16* (2013.01); *H04M 7/123* (2013.01); *H04L 12/6418* (2013.01)
USPC ........... 370/401; 370/338; 370/452; 370/331; 370/352; 370/466; 370/467; 370/353; 370/354; 370/356

(58) Field of Classification Search
USPC ........................................................ 370/401
See application file for complete search history.

(56) References Cited

U.S. PATENT DOCUMENTS 6,600,733 B2 * 7/2003 Deng ........................... 370/352
6,791,988 B1 * 9/2004 Hameleers et al. ........... 370/401
(Continued)

FOREIGN PATENT DOCUMENTS

EP         1641193 A1    3/2006
GB         2448708 A     10/2008
(Continued)

OTHER PUBLICATIONS

The European search report for EP10729209 mailed on May 4, 2012.
(Continued)

*Primary Examiner* — Ian N Moore
*Assistant Examiner* — Lakeram Jangbahadur
(74) *Attorney, Agent, or Firm* — Sughrue Mion, PLLC

(57) ABSTRACT

When a location of a portable terminal connected to another network beyond a packet communication network side changes, the gateway apparatus that is arranged between a mobile circuit switching network and a packet communication network (IMS network) and that performs mutual conversion between a circuit switching protocol and a packet communication protocol to execute voice communication, exercises control such that at least one of a sequence number and a timestamp in a packet destined to a portable terminal and output to the packet communication network, is made to vary continuously before and after movement of the portable terminal, in case the portable terminal connected to a network beyond the packet communication network side, moves its location.

15 Claims, 9 Drawing Sheets

(56) References Cited

U.S. PATENT DOCUMENTS

| | | | | |
|---|---|---|---|---|
| 6,904,035 | B2* | 6/2005 | Requena | 370/338 |
| 6,928,067 | B1* | 8/2005 | Hameleers et al. | 370/352 |
| 7,054,297 | B1* | 5/2006 | Smith | 370/338 |
| 7,154,881 | B2* | 12/2006 | Yang | 370/352 |
| 7,188,185 | B2* | 3/2007 | Dowling | 709/230 |
| 7,260,070 | B1* | 8/2007 | Smith | 370/328 |
| 7,411,976 | B2* | 8/2008 | Totzke | 370/467 |
| 7,801,035 | B2* | 9/2010 | Hundscheidt et al. | 370/230 |
| 7,916,715 | B2* | 3/2011 | Rezaiifar et al. | 370/352 |
| 7,944,862 | B2* | 5/2011 | Taylor et al. | 370/261 |
| 8,121,027 | B2* | 2/2012 | Watanabe et al. | 370/229 |
| 8,175,236 | B2* | 5/2012 | Pandey et al. | 379/114.2 |
| 8,194,648 | B2* | 6/2012 | Bloomfield et al. | 370/352 |
| 8,305,980 | B1* | 11/2012 | Nix | 370/329 |
| 2002/0064164 | A1* | 5/2002 | Barany et al. | 370/401 |
| 2002/0110123 | A1* | 8/2002 | Shitama | 370/389 |
| 2002/0126631 | A1* | 9/2002 | Lee | 370/328 |
| 2002/0146000 | A1* | 10/2002 | Jonsson et al. | 370/352 |
| 2003/0091032 | A1* | 5/2003 | Laxman et al. | 370/352 |
| 2003/0142662 | A1* | 7/2003 | Mahajan | 370/352 |
| 2004/0008735 | A1* | 1/2004 | Gilchrist et al. | 370/522 |
| 2004/0095939 | A1 | 5/2004 | Yang | |
| 2004/0213272 | A1* | 10/2004 | Nishi et al. | 370/401 |
| 2005/0094803 | A1* | 5/2005 | Watanabe | 379/406.01 |
| 2005/0195842 | A1* | 9/2005 | Dowling | 370/401 |
| 2006/0187903 | A1* | 8/2006 | Kallio et al. | 370/352 |
| 2007/0171895 | A1* | 7/2007 | Oberle et al. | 370/352 |
| 2010/0128715 | A1* | 5/2010 | Dei et al. | 370/352 |
| 2010/0315995 | A1 | 12/2010 | Bloomfield et al. | |
| 2011/0032880 | A1* | 2/2011 | Ozawa | 370/328 |
| 2011/0268035 | A1* | 11/2011 | Ozawa | 370/328 |
| 2011/0274116 | A1* | 11/2011 | Ozawa | 370/401 |
| 2012/0082150 | A1* | 4/2012 | Ozawa | 370/338 |
| 2012/0099432 | A1* | 4/2012 | Bercovich et al. | 370/235 |
| 2012/0218899 | A1* | 8/2012 | Ozawa | 370/237 |
| 2013/0170471 | A1* | 7/2013 | Nix | 370/331 |

FOREIGN PATENT DOCUMENTS

| | | |
|---|---|---|
| JP | 2002044149 A | 2/2002 |
| WO | 1999017469 A | 4/1999 |

OTHER PUBLICATIONS

International Search Report for PCT/JP2010/050046 mailed Apr. 13, 2010

3GPP TS29.183 V8.5.0, Technical. Specification Group Core Network and Terminals; Interworking between the IP Multimedia (IM) Core Network (CN) subsystem and Circuit Switched (CS) networks (Release 8), Dec. 2008, pp. 130-132.

* cited by examiner

GATEWAY APPARATUS, METHOD AND SYSTEM

REFERENCE TO RELATED APPLICATION

This application is the National Phase of PCT/JP2010/050046, filed Jan. 6, 2010, which is based upon and claims the benefits of the priorities of Japanese patent applications No. 2009-004047 filed on Jan. 9, 2009 and No. 2009-004049 filed on Jan. 9, 2009, the disclosure of which is incorporated herein in its entirety by reference thereto.

TECHNICAL FIELD

The present invention relates to a gateway, and particularly to a gateway apparatus, method and system arranged between a mobile circuit switching network and an IMS network and interconnecting voice communication.

BACKGROUND

Currently, a mobile telephone terminal and mobile telephone network using the third generation W-CDMA (Wideband Code Division Multiple Access) technology realize voice telephony and TV telephone services by using a circuit switching network or circuit switching protocol.

Meanwhile, there is a trend in which these multimedia services such as voice and TV telephone services are realized on an IP network using IMS (IP Multimedia Subsystem), and it is more likely that these services are integrated on the IMS network in the future. For the configuration of IMS, one can refer to 3GPP (Third Generation Partner Project) TS23.002 and 3GPP 23.228.

Due to research and development on high-speed and large capacity technologies for mobile networks, the speed and capacity of mobile networks based on IP have increased and as of now these networks have been implemented: HSDPA (High Speed Downlink Packet Access), HSPA (High Speed Packet Access), EVDO Rev. A, and EVDO Rev. B.

In the future, transmission at even higher speed will be possible, and LTE (Long Term Evolution), EPC (Evolved Packet Core), UMB (Ultra Mobile Broadband) and Mobile WiMax aiming at downlink peak rates of at least 100 Mbps (Mega bits per second) and uplink rates of at least 50 Mbps will be introduced.

Further, it is predicted that voice telephony will evolve into VoIP (Voice over IP) based on IP in these transmission schemes.

Patent Document 1 discloses a configuration in which a mobile terminal switches from a first media gateway MG1 to a second media gateway MG2 during a handover; after the handover, an anchor media gateway MG0 calculates the difference between a reference value received from the second media gateway MG2 and a reference value that was received from the first media gateway when no handover occurred; this difference is then returned to the second media gateway MG2 to synchronize its series therewith; and the second media gateway MG2 receives the difference and changes the reference value. In Patent Document 1, the first and the second media gateways MG1 and MG2 and the anchor media gateway MG0 communicate on an IP network.

Patent Document 2 discloses the configuration of a mobile communication system in which a mobile switching center is enabled to identify the order of signals sent by a mobile station by adding a multi-frame number on a radio channel to a packet header transmitted by a radio base station to the mobile switching center, thereby avoiding to mistake the order of information transmitted from the mobile switching center to a public network upon handover. In this mobile communication system, the mobile switching centers, to which the radio base stations are connected, provide serial numbers to information of time slots in frames of downlinks transmitted from two adjacent radio base stations to one mobile station, and handover processing is performed based on these serial numbers.

Patent Document 1

Japanese Patent Kokai Publication No. JP-P2002-44149A

Patent Document 2

WO1999/017469 (International Publication Number 1999/017469, pamphlet)

SUMMARY

An analysis on the related technologies by the present invention will be given below.

Regarding the trend in which voice telephone services currently realized on widespread circuit switching networks or circuit switching protocols are achieved on an IMS network, a gateway apparatus achieving an interconnection of circuit switching protocol frame signals and call control signals to an IMS network has not been realized.

Further, even in case the interconnection is achieved by providing a gateway, when a terminal moves thereby moving its location and the gateway apparatus does not do anything to deal with this, various problems such as the audio heard by the terminal becoming intermittent, increased delays, or excess noise may occur due to discontinuous transmission of voice packets and transmission of excess packets.

Further, during a transition period in which voice telephony evolves into VoIP based on IP, VoIP terminals operating on for instance an LTE or EPC network that will become widespread in the future and terminals operating on an existing circuit switching network will coexist, requiring an interconnection of voice telephony on the existing circuit switching network and VoIP on a mobile high-speed network such as LIE and EPC networks.

However, this interconnection is difficult to achieve since no gateway apparatus for enabling the interconnection exists.

Further, even in case the interconnection is achieved by providing a gateway, when a terminal moves thereby moving its location and the gateway apparatus does not do anything to deal with this, various problems such as the audio heard by the terminal becoming intermittent, increased delays, or excess noise may occur due to discontinuous transmission of voice packets and transmission of excess packets.

It is an object of the present invention to provide a gateway apparatus, method, and system realizing the interconnection of circuit switching protocol frame signals and call control signals to an IMS network and capable of continuing voice communication even if a terminal moves.

Further, it is another object of the present invention to provide a gateway apparatus, method, and system realizing the interconnection between a terminal connected to a mobile circuit switching network and a VoIP terminal connected to a mobile high-speed network thereby realizing voice telephone calls therebetween and capable of continuing voice communication even if a terminal moves.

According to the present invention, there is provided a gateway apparatus that is arranged between a mobile circuit switching network and a packet communication network, the apparatus comprising a conversion unit that performs mutual conversion between a circuit switching protocol and a packet communication protocol to perform voice communication, wherein the conversion unit performs control such that at least one of a sequence number and a timestamp in a packet, which is destined to a first terminal and for output to the packet communication network, is made to vary continuously before and after movement of the first terminal, in case the first terminal connected to the packet communication network or another network beyond the packet communication network, moves is location.

According to the present invention, there is provided a communication system comprising:

a mobile circuit switching network connected to a terminal by circuit switching;

a packet communication network that performs packet communication; and a gateway apparatus that is arranged between the mobile circuit switching network and the packet communication network and that includes a conversion unit that performs mutual conversion between a circuit switching protocol and an IMS protocol to perform voice communication, wherein the conversion unit exercises control such that at least one of a sequence number and a timestamp in a packet, which is destined to a first terminal and for output to the packet communication network, is made to vary continuously before and after the movement of the first terminal, in case the first terminal connected to the packet communication network or another network beyond the packet communication network moves its location.

According to the present invention, there is provided a gateway method that performs mutual conversion between a circuit switching protocol and a packet communication protocol to perform voice communication between a mobile circuit switching network and a packet communication network, wherein the method comprises exercising control such that at least one of a sequence number and a timestamp in a packet, which is destined to a first terminal and for output to the packet communication network, is made to vary continuously before and after the movement of the first terminal, in case the first terminal connected to the packet communication network or another network beyond the packet communication network, moves its location.

According to the present invention, there is provided a gateway apparatus that is arranged between a mobile circuit switching network and an IMS (IP Multimedia Subsystem) network and that performs mutual conversion between a circuit switching protocol and an IMS protocol to perform voice communication, wherein the gateway apparatus comprises means that exercises such that at least one of a sequence number and a timestamp in a packet output to the IMS network is made to vary continuously before and after the movement of a terminal, in case the terminal connected to another network beyond the IMS network side moves its location.

According to the present invention, there is provided a gateway apparatus that is arranged between a mobile circuit switching network and an IMS (IP Multimedia Subsystem) network and that performs mutual conversion between a circuit switching protocol and an IMS protocol to perform voice communication, wherein the gateway apparatus comprises means that exercises control to receive the packet after clearing at least one of a reception buffer that receives the packet,
a jitter buffer,
a timestamp, and a sequence number, when movement of the first terminal is completed, in case the first terminal moves its location when the gateway apparatus receives a packet from the packet communication network and converts the packet into a circuit switching protocol to output the converted protocol to the mobile circuit switching network.

According to the present invention, there is provided a gateway apparatus that is arranged between a mobile circuit switching network and an IMS (IP Multimedia Subsystem) network and that performs mutual conversion between a circuit switching protocol and an IMS protocol to perform voice communication, wherein the gateway apparatus comprises means that exercises control such that at least one of a sequence number and a timestamp in a packet output to the IMS network is made to vary continuously before and after the movement of a terminal, in case the terminal connected to the mobile circuit switching network moves its location on the mobile circuit switching network.

According to the present invention, there is provided a gateway apparatus that is arranged between a mobile circuit switching network and an IMS (IP Multimedia Subsystem) network and that performs mutual conversion between a circuit switching protocol and an IMS protocol to perform voice communication, wherein the gateway apparatus comprises means that exercises control such that a number of a frame on an IuUP (Iu User Plane) protocol output to the mobile circuit switching network is made to vary continuously before and after the movement of a terminal, in case the terminal connected to the mobile circuit switching network moves its location on the mobile circuit switching network.

According to the present invention, there is provided a gateway method that performs mutual conversion between a circuit switching protocol and an IMS protocol to perform voice communication between a mobile circuit switching network and an IMS network, wherein the method comprises exercising control such that at least one of a sequence number and a timestamp in a packet output to the IMS network is made to vary continuously before and after the movement of a terminal, in case the terminal connected to another network beyond the IMS network side moves its location.

According to the present invention, there is provided a gateway method that performs mutual conversion between a circuit switching protocol and an IMS protocol to perform voice communication between a mobile circuit switching network and an IMS network, wherein the method comprises:

exercising control to receive a packet after clearing the content of at least one of:

a reception buffer that receives the packet,
a jitter buffer,
a timestamp, and
a sequence number, when the movement of a terminal is completed, in case the terminal connected to another network beyond the IMS network side moves its location, when the gateway receives the packet from the IMS network, converts the packet into the circuit switching protocol and outputs the converted protocol to the mobile circuit switching network.

According to the present invention, there is provided a gateway method that performs mutual conversion between a circuit switching protocol and an IMS protocol to perform voice communication between a mobile circuit switching network and an IMS network, wherein the method comprises exercising control such that at least one of a sequence number and a timestamp in the packet output to the IMS network, is made to vary continuously before and after the movement of a terminal, in case a terminal connected to the mobile circuit switching network side moves its location on the mobile circuit switching network.

According to the present invention, there is provided a gateway method that performs mutual conversion between a circuit switching protocol and an IMS protocol to perform voice communication between a mobile circuit switching network and an IMS network, wherein the method comprises exercising control such that a number a frame on an IuUP (Iu User Plane) protocol output to the mobile circuit switching network is made to vary continuously before and after movement of the terminal.

According to the present invention, there is provided a program causing a gateway apparatus that is arranged between a mobile circuit switching network and an IMS network and that performs mutual conversion between a circuit switching protocol and an IMS protocol to perform voice communication, to execute the processing comprising:

performing control such that at least one of a sequence number and a timestamp in a packet output to the IMS network is made to vary continuously before and after the movement of a terminal, in case the terminal connected to another network beyond the IMS network side moves its location.

According to the present invention, there is provided a program that causes a computer constituting a gateway apparatus that is arranged between a mobile circuit switching network and an IMS network and performing mutual conversion between a circuit switching protocol and an IMS protocol to perform voice communication execute the processing comprising controlling to receive a packet after clearing content of at least one of:
  a reception buffer that receives the packet,
  a jitter buffer,
  a timestamp, and
  a sequence number at the completion of the movement of a terminal, in case the terminal connected to another network beyond the IMS network side moves its location when the gateway apparatus receives the packet from the IMS network and converts the packet into the circuit switching protocol and outputs the converted protocol to the mobile circuit switching network.

According to the present invention, there is provided a program that causes a computer constituting a gateway apparatus that is arranged between a mobile circuit switching network and an IMS network and performing mutual conversion between a circuit switching protocol and an IMS protocol to perform voice communication execute the processing comprising controlling at least one of a sequence number and a timestamp of a packet in a packet output to the IMS network to vary continuously before and after movement of a terminal, in case the terminal connected to the mobile circuit switching network moves its location on the mobile circuit switching network.

According to the present invention, there is provided a program that causes a computer constituting a gateway apparatus that is arranged between a mobile circuit switching network and an IMS network and performing mutual conversion between a circuit switching protocol and an IMS protocol to perform voice communication execute the processing comprising exercising control such that a number of a frame on an IuUP (Iu User Plane) protocol output to the mobile circuit switching network is made to vary continuously before and after the movement of a terminal, in case the terminal connected to the mobile circuit switching network moves its location on the mobile circuit switching network.

The present invention can be applied not only to a gateway apparatus that is arranged between a mobile circuit switching network and an IMS (IP Multimedia Subsystem) network, but also to a gateway apparatus that is arranged between a mobile high-speed network and a mobile circuit switching network and that performs mutual conversion between a circuit switching protocol and a packet protocol to perform voice communication. According to the present invention, there is provided a gateway apparatus that is arranged between a mobile high-speed network and a mobile circuit switching network and that performs mutual conversion between a circuit switching protocol and a packet protocol to perform voice communication, wherein the gateway apparatus comprises means that exercises control such that at least one of a sequence number and a timestamp of a packet output to the mobile high-speed network is made to vary continuously before and after the movement of a terminal, in case the terminal connected to the mobile high-speed network moves its location on the mobile high-speed network.

According to the present invention, there is provided a gateway apparatus that is arranged between a mobile high-speed network and a mobile circuit switching network and that performs mutual conversion between a circuit switching protocol and a packet protocol to perform voice communication, wherein the gateway apparatus comprises means that exercises control so as to receive a packet after clearing content of at least one of:
  a reception buffer that receives the packet,
  a timestamp, and
  a sequence number, at the completion of movement of a terminal, in case one of terminals connected to the mobile high-speed network moves its location on the mobile high-speed network, when the gateway apparatus receives the packet from the mobile high-speed network, converts the protocol thereof, and outputs the converted protocol to the mobile circuit switching network.

According to the present invention, there is provided a gateway apparatus that is arranged between a mobile high-speed network and a mobile circuit switching network and that performs mutual conversion between a circuit switching protocol and a packet protocol to perform voice communication, wherein the gateway apparatus comprises means that exercises control such that a number of a frame on the circuit switching protocol output to the mobile circuit switching network is made to vary continuously before and after movement of a terminal, in case one of the terminals moves its location on the mobile circuit switching network.

According to the present invention, there is provided a gateway method that performs mutual conversion between a circuit switching protocol and a packet protocol to perform voice communication between a mobile high-speed network and a mobile circuit switching network, wherein the method comprises exercising control such that at least one of a sequence number and a timestamp of a packet in the packet output to the mobile high-speed network is made to vary continuously before and after movement of a terminal, in case the terminal connected to the mobile high-speed network moves its location on the mobile high-speed network.

According to the present invention, there is provided a gateway method that performs mutual conversion between a circuit switching protocol and a packet protocol to perform voice communication between a mobile high-speed network and a mobile circuit switching network, wherein the method comprises exercising control to receive a packet after clearing content of at least one of:

a reception buffer that receives the packet from a terminal, a timestamp, and a sequence number, at the completion of the movement of a terminal, in case the terminal connected to the mobile high-speed network moves its location on the mobile high-speed network, when the gateway receives the packet from the mobile high-speed network, coverts the protocol, and outputs the converted protocol to the mobile circuit switching network.

According to the present invention, there is provided a gateway method that performs mutual conversion between a circuit switching protocol and a packet protocol to perform voice communication between a mobile high-speed network and a mobile circuit switching network, wherein the method comprises exercising control such that a number of a frame on the circuit switching protocol output to the mobile circuit switching network is made to vary continuously before and after movement of a terminal, in case the terminal connected to the mobile circuit switching network moves its location on the mobile circuit switching network.

According to the present invention, there is provided a program that causes a computer constituting a gateway apparatus that is arranged between a mobile high-speed network and a mobile circuit switching network and that performs mutual conversion between a circuit switching protocol and a packet protocol to perform voice communication to execute the processing comprising exercising control such that at least one of a sequence number and a timestamp in a packet output to the mobile high-speed network is made to vary continuously before and after movement of a terminal, in case the terminal connected to the mobile high-speed network moves its location on the mobile high-speed network.

According to the present invention, there is provided a program that causes a computer constituting a gateway apparatus that is arranged between a mobile high-speed network and a mobile circuit switching network and that performs mutual conversion between a circuit switching protocol and a packet protocol to perform voice communication to execute the processing comprising exercising control to receive a packet after clearing content of at least one of:

a reception buffer that receives the packet from a terminal, a timestamp, and a sequence number, at the completion of the movement of a terminal, in case the terminal connected to the mobile high-speed network moves its location on the mobile high-speed network when the gateway apparatus receives the packet from the mobile high-speed network, converts the protocol thereof, and outputs the converted protocol to the mobile circuit switching network.

According to the present invention, there is provided a program that causes a computer constituting a gateway apparatus that is arranged between a mobile high-speed network and a mobile circuit switching network and that performs mutual conversion between a circuit switching protocol and a packet protocol to perform voice communication to execute the processing comprising exercising control such that a number of a frame on the circuit switching protocol output to the mobile circuit switching network is made to vary continuously before and after movement of a terminal, in case the terminal connected to the mobile circuit switching network moves its location on the mobile circuit switching network.

According to the present invention, an interconnection of a circuit switching protocol frame signal and a call control signal to an IMS network can be realized and voice communication can be maintained even when a terminal moves.

According to the present invention, it becomes possible to interconnect a terminal connected to a mobile circuit switching network and a VoIP terminal connected to a mobile high-speed network so as to realize voice telephony and to maintain voice communication even when the terminal moves.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

PREFERRED MODES

The following describes exemplary embodiments of the present invention. A gateway apparatus according to one of modes of the present invention connects a voice telephone service, which is realized by using a circuit switching network or a circuit switching protocol, to an IMS core network and implements the voice telephone service in a framework of service provided by IMS. When a terminal connected to another network beyond the IMS network moves its location, the gateway apparatus according to the present invention controls such that at least one of a sequence number and a timestamp in a packet output to the IMS network is made to vary continuously before and after the movement of the terminal. As a result, even when the terminal moves to change its location, problems such as an audio signal heard by the terminal undergoes discontinuity, increased delay, or excess noise that occur after the terminal has moved due to discontinuous transmission of an audio packet and transmission of an excess packet can be solved.

The gateway apparatus according to one of modes of the present invention is arranged between a mobile high-speed network and a mobile circuit switching network, and performs mutual conversion between a circuit switching protocol and a packet protocol to perform voice communication. When one of terminals performing voice communication moves its location on the mobile high-speed network, the gateway apparatus according to one of modes of the present invention, performs control such that at least a sequence number or a timestamp in a packet output to the mobile high-speed network is made to vary continuously before and after the movement of the terminal. According to the present invention, the problem that an audio signal undergoes discontinuity, increased delay, or excess noise that occur when a terminal moves to change its location can be solved exemplary embodiments will be described below.

[Exemplary Embodiment 1]

Figure 1:
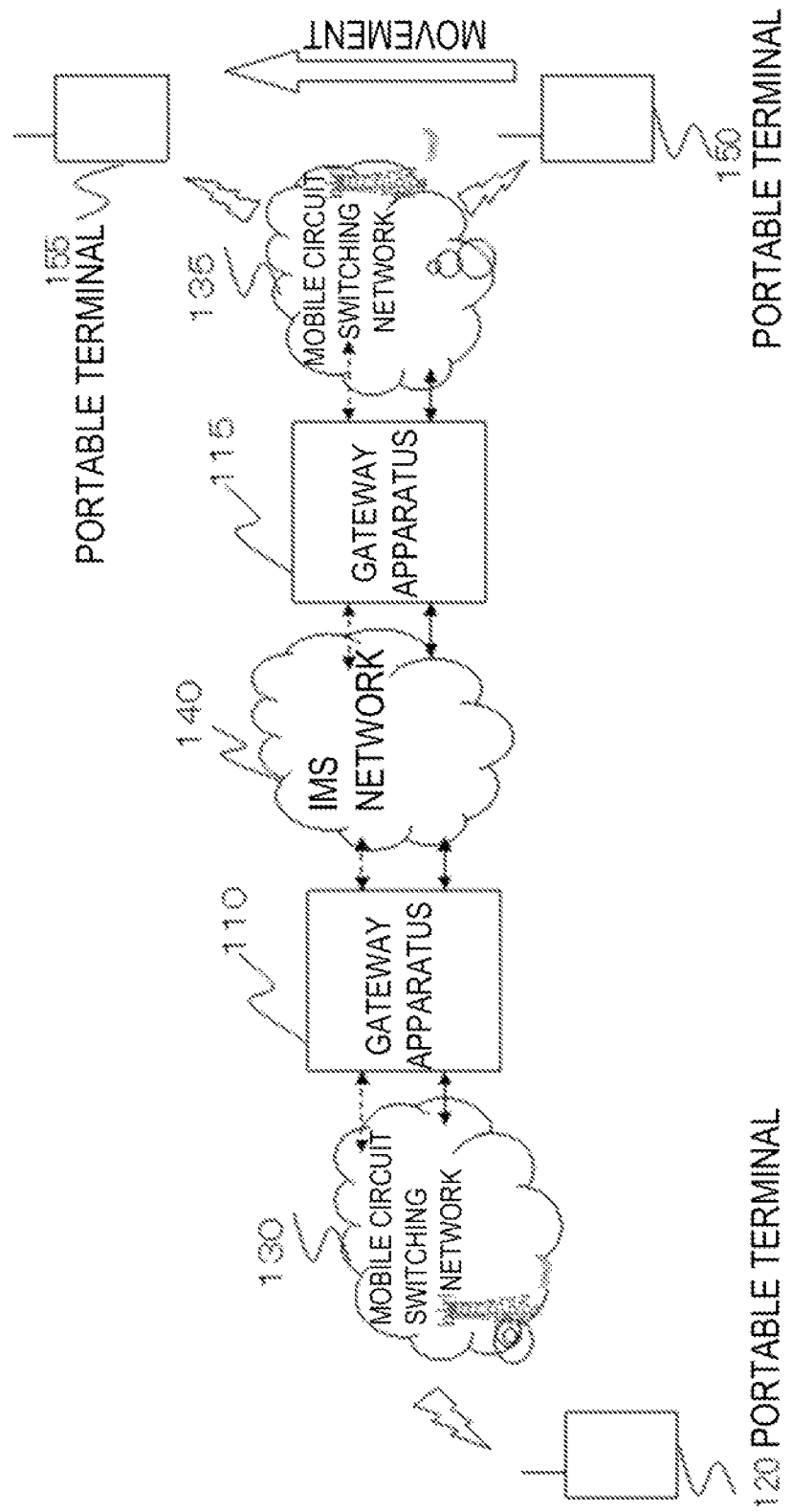
FIG. 1 is a diagram illustrating a system configuration of a first exemplary embodiment of the present invention.

FIG. 1 is a diagram illustrating the network configuration and topology of a gateway apparatus in an exemplary embodiment of the present invention. Referring to FIG. 1, a portable terminal 120 is an existing voice telephone terminal connected to a mobile circuit switching network. The portable terminal 120 is connected to the mobile circuit switching network 130, is equipped with for instance an AMR (Adaptive Multi-Rate) audio codec, and transmits/receives a bit stream obtained by performing compression encoding of an audio signal at a bit rate of 12.2 kbps (kilobit per second). As for details of the AMR audio codec, reference can be made to, for instance, the 3GPP TS26.090 standard.

In the mobile circuit switching network 130, a base station NodeB and a radio network control unit RNC transmit/receive an AMR stream in a format stored in an IuUP (Iu User Plane) line switching protocol. Further, as a call processing signal, a call processing signal used in the mobile circuit switching network 130 is output. As for details of the IuUP protocol, reference can be made to the 3GPP TS25.415 standard.

The gateway apparatus 110 is connected to both the mobile circuit switching network 130 and an IMS network 140 and interconnects voice communication between the two. In other words, the interconnection is performed by converting call control signals and protocols relating to audio data.

In case of a voice telephone call between portable terminals, on the side to which the other portable terminal belongs beyond the IMS network 140, a gateway apparatus 115 (mirror configuration with respect to the gateway apparatus 110 in which input and output are reversed but operation is identical), a mobile circuit switching network 135, and a portable terminal 150, the other portable terminal, are connected.

As with the portable terminal 120, the portable terminal 150 has for instance is equipped with an AMR audio codec, performs compression encoding of an audio signal at a bit rate of for instance 12.2 kbps (kilobit per second), and generates and outputs a bit stream.

FIG. 1 shows a configuration for a situation in which the portable terminal 120 and the portable terminal 150 were originally performing voice communication, and then the portable terminal 150 moves on the mobile circuit switching network 135 and changes its location to becomes one indicated by a reference numeral 155, as a matter of convenience, while the voice communication between the portable terminals 155 and 120 still continues after the movement of the portable terminal 150.

Figure 2:
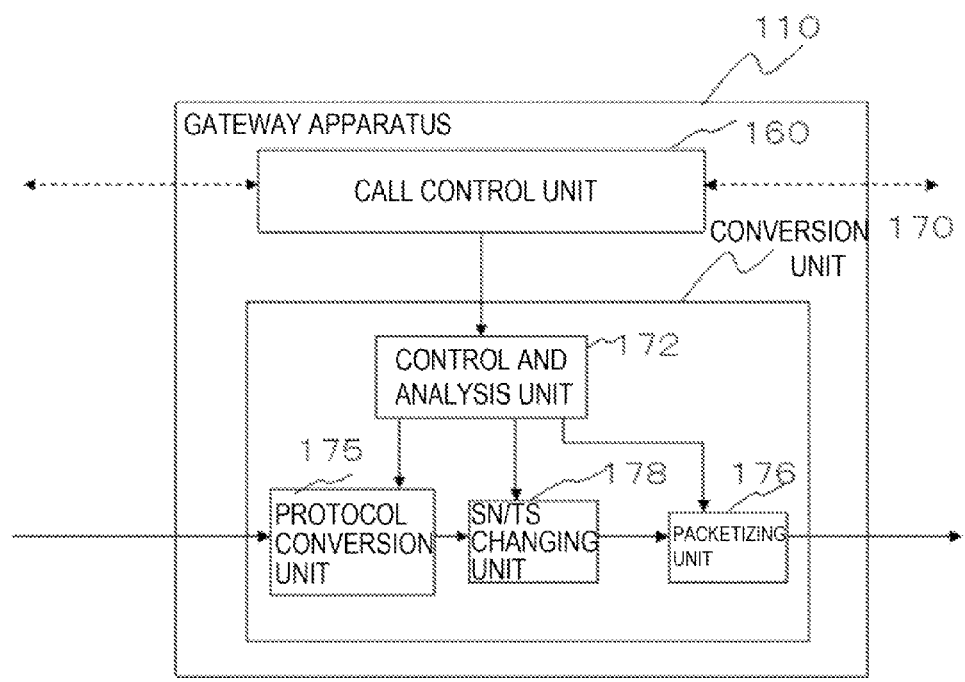
FIG. 2 is a diagram illustrating a configuration (1) of a gateway apparatus of the first exemplary embodiment of the present invention.
Figure 3:
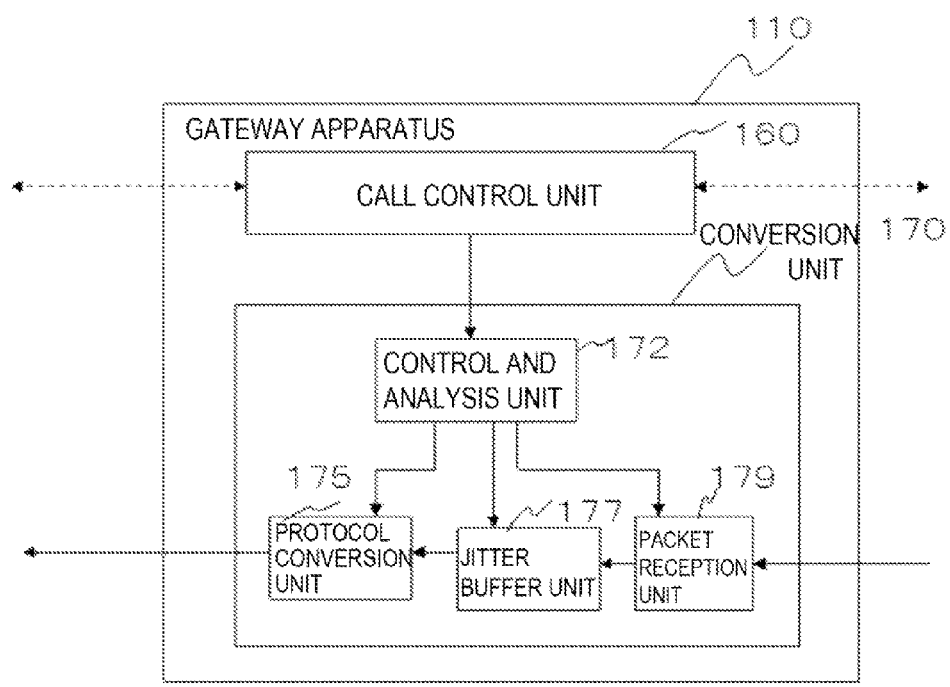
FIG. 3 is a diagram illustrating a configuration (2) of the gateway apparatus of the first exemplary embodiment of the present invention.

FIGS. 2 and 3 are diagrams illustrating the configuration of the gateway apparatus 110 shown in FIG. 1. FIG. 2 shows the configuration in case audio data is transferred in the direction from the mobile circuit switching network 130 to the IMS network 140. Referring to FIG. 2, the gateway apparatus 110 comprises a call control unit 160 and a conversion unit 170. The conversion unit 170 comprises a control and analysis unit 172, a protocol conversion unit 175, an SN/TS changing unit 178, and a packetizing unit 176.

FIG. 3 shows the configuration in case audio data is transferred in the direction from the IMS network 140 to the mobile circuit switching network 130. Referring to FIG. 3, the conversion unit 170 comprises the control and analysis unit 172, the protocol conversion unit 175, a jitter buffer unit 177, and a packet reception unit 179. Further, as described above, since the gateway apparatus 115 shown in FIG. 1 operates identically to the gateway apparatus 110 while having its input and output reversed, the explanation of it will be omitted. In FIGS. 2 and 3, the processing and functions of the call control unit 160 and the conversion unit 170 (the control and analysis unit 172, the protocol conversion unit 175, the SN/TS changing unit 178, the packetizing unit 176, the jitter buffer unit 177, and the packet reception unit 179) may be implemented by a program executed by a computer constituting the gateway apparatus 110.

The following described the configuration in the direction from the mobile circuit switching network 130 to the IMS network 140 with reference to FIGS. 1 and 2.

Figure 5:
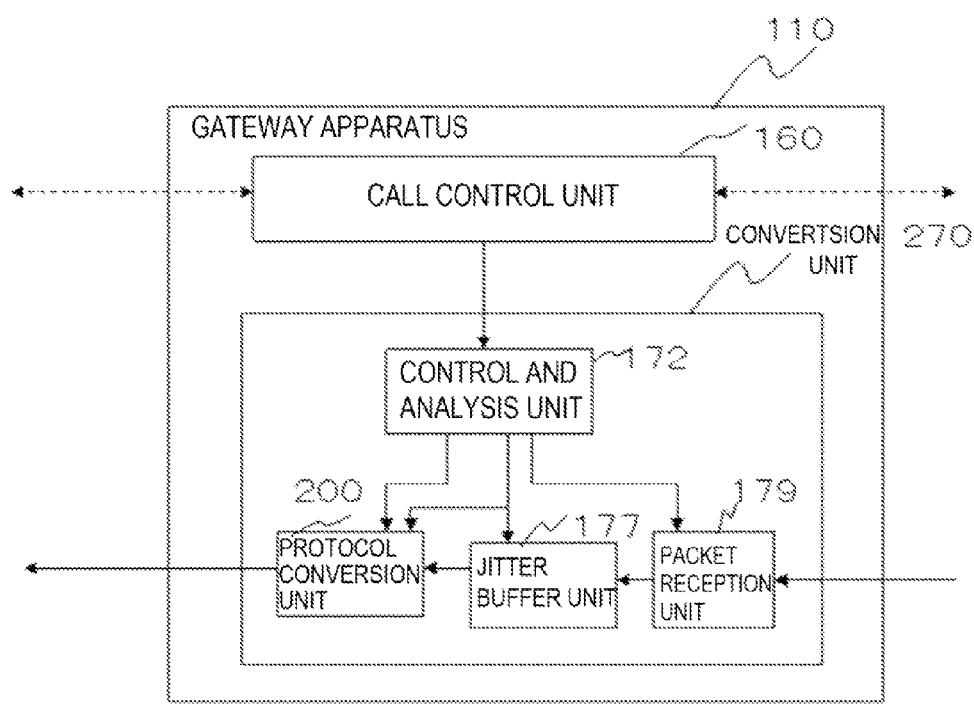
FIG. 5 is a diagram illustrating a configuration of a gateway apparatus of a second exemplary embodiment of the present invention.

In FIG. 5, the call control unit 160 receives a call control signal (for example SIP (Session Initiation Protocol) or SDP (Session Description Protocol) signal) from the IMS network 140, converts the received signal into a circuit switching call control signal, and outputs the resulting signal to the mobile circuit switching network 130. Further, the call control unit 160 performs reverse conversion by converting a circuit switching call control signal received from the mobile circuit switching network 130 into for example a SIP or SDP signal and outputs the converted signal to the IMS network 140. As for details of SIP and SDP, reference can be made to, for example, IFTF (The Internet Engineering Task Force) RFC 3261 and RFC 2327 (Session Description Protocol), respectively.

Further, the call control unit 160 receives information regarding a location of the portable terminal 150 and decides whether or not an IP address of a packet of a corresponding channel transmitted from the gateway apparatus 110 to the IMS network 140 changes due to the movement of the portable terminal 150.

When it is decided that the IP address of the packet of the corresponding channel changes, the call control unit 160 outputs an instruction to change a destination IP address to the packetizing unit 176 and outputs a movement completion notification to the SN/TS changing unit 178, wherein SN stands for Sequence Number and TS stands for Time Stamp.

The call control unit 160 outputs preset information out of information included in the call control signal received from the mobile circuit switching network 130 and information included in the call control signal (SIP or SDP) received from the IMS network 140 to the control and analysis unit 172 in the conversion unit 170 for each channel.

The control and analysis unit 172 compares the information of each channel received from the call control unit 160 and decides whether or not protocol conversion is necessary.

When protocol conversion is needed, the control and analysis unit 172 outputs, for each channel, conversion information indicating what kind of conversion it to be performed to the protocol conversion unit 175.

The protocol conversion unit 175 receives an IuUP circuit switching protocol from the mobile circuit switching network 130 and reads out a compression encoded audio bit stream stored in the protocol. Here, the compression encoded audio bit stream is a bit stream compression encoded in accordance with AMR.

Further, the protocol conversion unit 175 receives the conversion information from the control and analysis unit 712 for each channel, and when protocol conversion is needed, according to the conversion information, the protocol conversion unit 175 constructs an RTP (Real-time Transport Protocol) payload format header, as defined in IETF RFC 3267, for example, for each channel, and stores the AMR compression encoded bit stream in the payload.

Here, since frame type information included in the AMR compression encoded bit stream indicates a bit rate, the protocol conversion unit 175 converts it into codec mode request (CMR) information as defined by RFC 3267.

Further, octet alignment and other needed parameters are set to predetermined setting values, according to RFC 3267.

The SN/TS changing unit 178 holds a preceding SN or TS. When the terminal moves and thereby changes an IP address thereof, the SN/TS changing unit 178 receives a movement completion notification from the control and analysis unit 172 and changes (re-allots) SN or TS, if necessary, after the reception of the movement completion notification, so that SN or TS of an RTP packet, which is sent to a different IP address when the movement completion notification is received, continuously varies, without going back in time and becoming older than or having the same value as the aforementioned SN or TS held.

The packetizing unit 176 receives information on the RTP payload format from the protocol conversion unit 175 and stores it in the RTP packet.

In case the terminal further moves and the IP address thereof is changed, the packetizing unit 176 receives a changed IP address from the control and analysis unit 172, while using the same IP address when it does not change, and transmits an RTP/UDP (User Datagram Protocol)/IP (Internet Protocol) to the IP address.

In FIG. 3, since the same reference numbers are given to elements same as those in FIG. 2 and the identical elements operate identically, the explanation of them will be omitted. Referring to FIG. 3, the configuration in the direction from the IMS network 140 to the mobile circuit switching network 130 will be described.

The call control unit 160 receives information regarding the location of the portable terminal 150 and decides whether or not the source IP address of a packet of a corresponding channel received from the IMS network 140 changes due to the movement of the portable terminal 150.

When a source IP address changes, the call control unit 160 outputs an instruction to change the source IP address to the packet reception unit 179 and outputs a movement completion notification to the jitter buffer unit 177.

The packet reception unit 179 receives a packet from the IMS network 140. When the source IP address is changed due to the movement of the portable terminal 150, the packet reception unit 179 receives a changed IP address from the control and analysis unit 172 and receives an RTP/UDP/IP packet after switching the route of the receiving node.

The jitter buffer unit 177 receives the RTP packet from the packet reception unit 179. The jitter buffer unit 177 eliminates jitter (a variation of delay) from the RTP packet. When the portable terminal 150 moves and its IP address is changed, the jitter buffer unit 177 receives a movement completion notification from the control and analysis unit 172. When receiving the movement completion notification, the jitter buffer unit 177 receives the RTP packet from the packet reception unit 179 after clearing content of at least one of the following: the jitter buffer, TS (Time Stamp), and SN (Sequence Number), and outputs the RTP packet to the protocol conversion unit 175.

In the above exemplary embodiment, other known codecs such as AMR-WB and G.711, in addition to AMR mentioned above, can be used as the audio codec used for generating a compression encoded audio bit stream.

The control and analysis unit 172 is arranged within the conversion unit 170, however, it may be provided inside the call control unit 160.

The call control unit 160 and the conversion unit 170 may be implemented separately in difference apparatuses. In such a configuration, for example, the ITU-T H. 248 Megaco protocol can be used for the exchange of control signals between the call control unit 160 and the conversion unit 170.

[Exemplary Embodiment 2]

Figure 4:
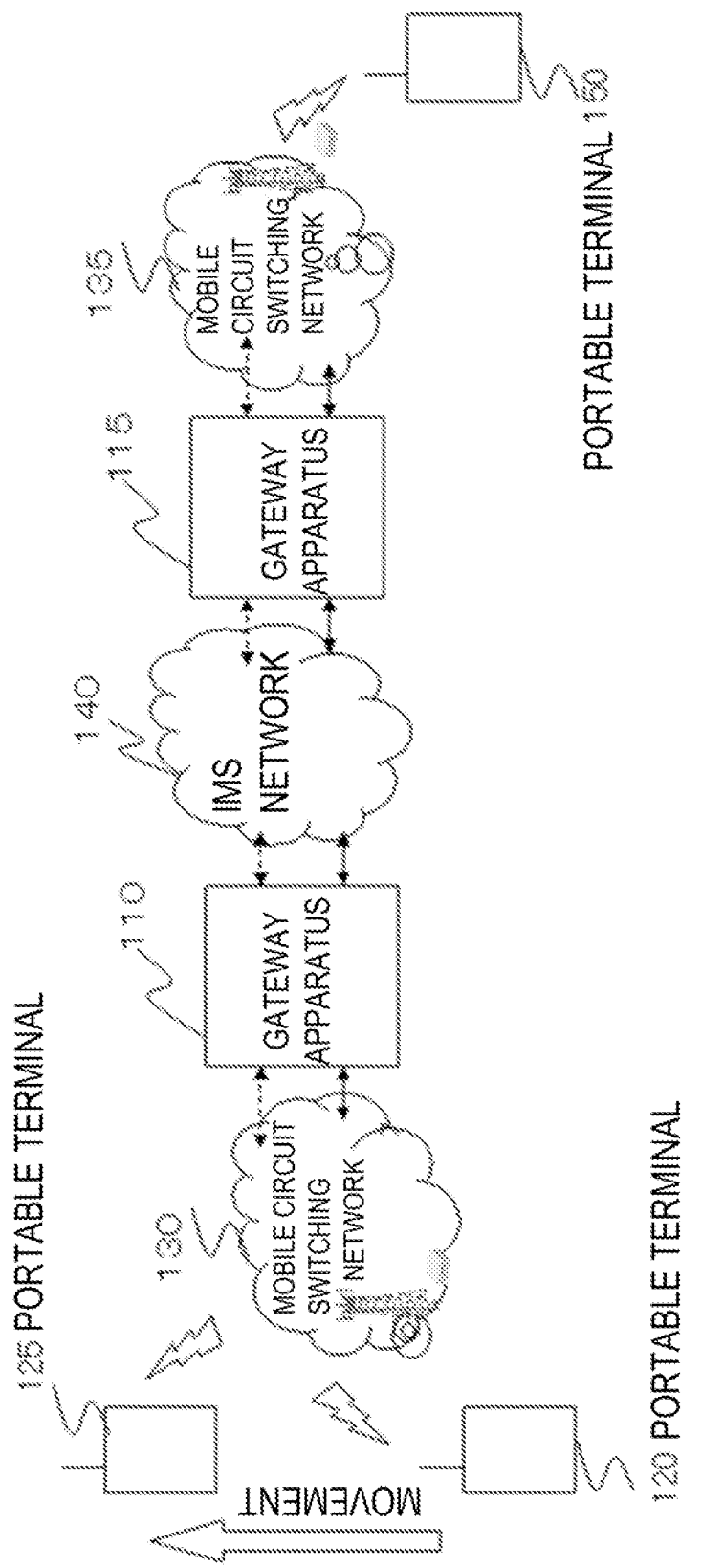
FIG. 4 is a diagram illustrating a system configuration of a second exemplary embodiment of the present invention.

The following describes a second exemplary embodiment of the present invention. FIG. 4 is a diagram illustrating the configuration of the second exemplary embodiment of the present invention. In FIG. 4, since the same reference numbers are given to elements same as those in FIG. 1 and the identical elements operate identically as described using FIG. 1, the explanation of them will be omitted.

In FIG. 4, the portable terminal 120 is connected to the mobile circuit switching network 130, moves its location on the mobile circuit switching network 130 to the position of a portable terminal 125 while performing voice communication, and continues the voice communication after the movement of its location.

In this case, the gateway apparatus 110 must make sure that either SN or TS of an RTP packet transmitted to the IMS network 140 is made to vary continuously before and after the movement of the portable terminal 120. The configuration in this case is identical to FIG. 2; therefore the explanation will be omitted.

Next, it is necessary that the IuUP circuit switching protocol is sent to the mobile circuit switching network 130 through different routes before and after the movement of the portable terminal 120, and the frame number of IuUP must continuously vary from immediately before the movement to immediately after the movement and thereafter.

FIG. 5 is a diagram illustrating the configuration (the configuration in the direction from the IMS network 140 to the mobile circuit switching network 130) of the gateway apparatus 110 shown in FIG. 4. Further, in the present exemplary embodiment, the configuration in the direction from the mobile circuit switching network 130 to the IMS network 140 is identical to FIG. 2.

The gateway apparatus 110 of the present exemplary embodiment realizes the function of having the frame number of IuUP varying continuously from immediately before the movement to immediately after the movement and thereafter.

In FIG. 5, the same reference numbers are given to elements same as those in FIG. 3. Since the elements having the same reference numbers operate identically to the corresponding elements in FIG. 3, the explanation of them will be omitted. Referring to FIG. 5, in the present exemplary embodiment, the control and analysis unit 172 outputs a notification that the portable terminal 120 has completed its movement to the jitter buffer unit 177 and a protocol conversion unit 200.

In FIG. 5, the protocol conversion unit 200 converts the protocol of a received packet into the IuUP protocol to be output to the mobile circuit switching network 130 in such a manner that the frame number included in the IuUP protocol is made to vary continuously.

More specifically, the protocol conversion unit 200 stores at least a frame number preceding by one in memory. When receiving the movement completion notification from the control and analysis unit 172, the protocol conversion unit 200 checks an IuUP frame number immediately after the movement completion notification is received and confirms that it is continuously varying from the frame number, stored in the memory (not shown in the diagram), immediately before the movement completion notification was received. If it is not varying continuously (for example the frame number goes back in time or the frame numbers have the same value, etc.), the protocol conversion unit 200 sends the IuUP protocol to the mobile circuit switching network 130 after performing re-allotment processing so that the frame number is continuous.

In the second exemplary embodiment of the present invention, other known codecs, in addition to AMR and G.711 mentioned above, can be used as the audio codec used for generating a compression encoded audio bit stream. Further, the control and analysis unit 172 is arranged within a conversion unit 270, however, it may be provided inside the call control unit 160.

Further, the call control unit 160 and the conversion unit 270 may be implemented separately in difference apparatuses. In such a configuration, for example, the ITU-T H. 248 Megaco protocol can be used for the exchange of control signals between the call control unit 160 and the conversion unit 270. In FIG. 5, the processing and functions of the call control unit 160 and the conversion unit 270 (the control and analysis unit 172, the protocol conversion unit 200, the jitter buffer unit 177, and the packet reception unit 179) may be implemented by a program executed by a computer constituting the gateway apparatus 110.

[Exemplary Embodiment 3]

Figure 6:
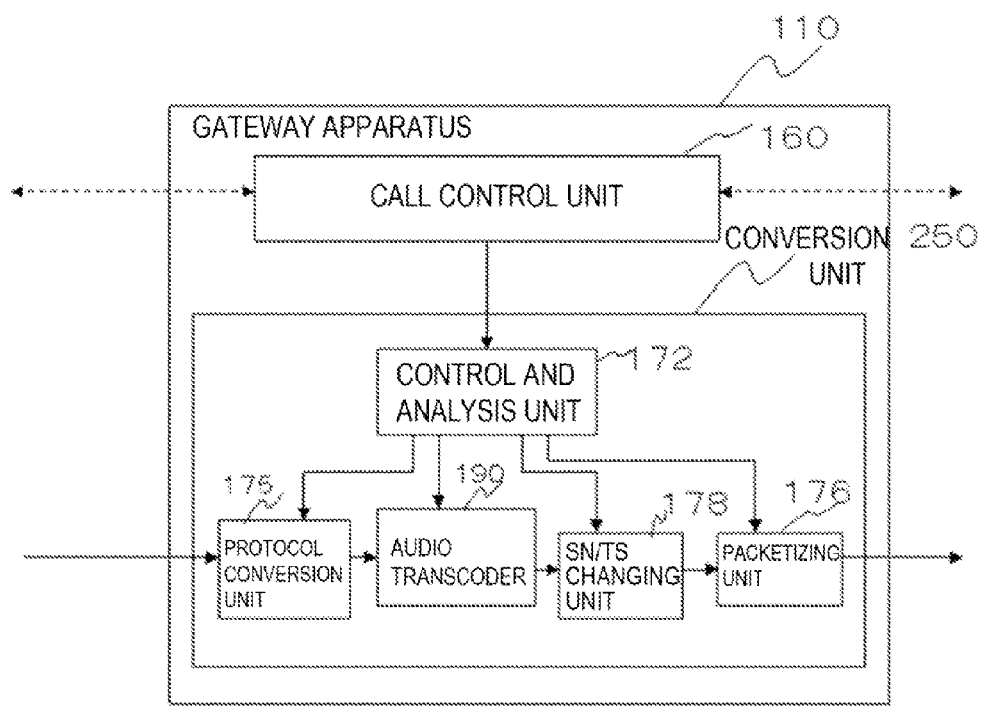
FIG. 6 is a diagram illustrating a configuration (1) of a gateway apparatus of a third exemplary embodiment of the present invention.

The following describes a third exemplary embodiment of the present invention. In the present exemplary embodiment, the portable terminal 120 and the portable terminal 150 (the portable terminal 155) use different audio compression encoding schemes in the configuration of FIG. 1. As a result, the configuration of the gateway apparatus 110 is different from the configuration shown in FIG. 2. FIG. 6 is a diagram illustrating the configuration of the gateway apparatus 110 in the present exemplary embodiment. It should be noted that, in FIG. 6, the same reference numbers are given to elements same as those in FIG. 2.

Referring to FIG. 6, an audio transcoder 190 is added between the protocol conversion unit 175 and the SN/TS changing unit 178 in a conversion unit 250. The audio transcoder 190 is inserted between the protocol conversion unit 175 and the SN/TS changing unit 178. Other than the audio transcoder 190, the configuration in FIG. 6 is identical to FIG. 2.

The audio transcoder 190 performs conversion of audio compression encoding scheme based on a conversion instruction from the control and analysis unit 172.

Here, as an example, it is assumed that the portable terminal 120 on the mobile circuit switching network 130 side has AMR installed and the portable terminal 150 (or the portable terminal 155) has G.711 installed. In this case, the audio transcoder 190 performs conversion of audio compression encoding scheme between AMR and G.711.

In the third exemplary embodiment of the present invention, other known codecs, in addition to AMR and G.711 mentioned above, can be used as the audio codec used for generating a compression encoded audio bit stream. Further, the control and analysis unit 172 is arranged within the conversion unit 250, however, it may be provided inside the call control unit 160.

Further, the call control unit 160 and the conversion unit 250 may be implemented separately in difference apparatuses. In such a configuration, for example, the ITU-T H. 248 Megaco protocol can be used for the exchange of control signals between the call control unit 160 and the conversion unit 250. In FIG. 6, the processing and functions of the call control unit 160 and the conversion unit 250 (the control and analysis unit 172, the protocol conversion unit 175, the audio transcoder 190, the SN/TS changing unit 178, and the packetizing unit 176) may be implemented by a program executed by a computer constituting the gateway apparatus 110.

Figure 7:
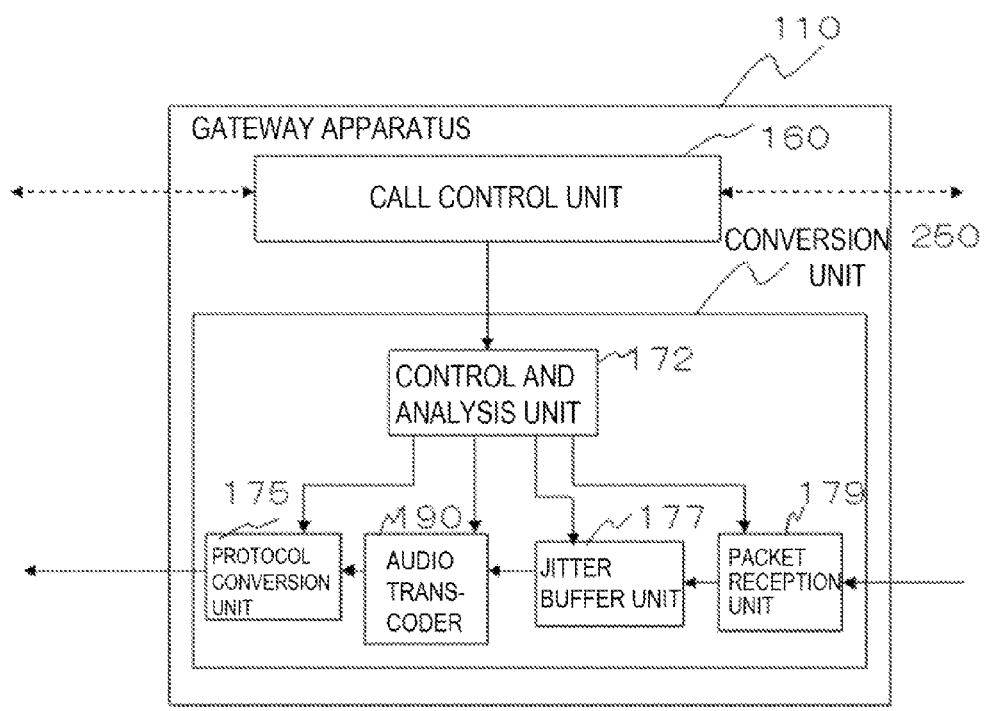
FIG. 7 is a diagram illustrating a configuration (2) of the gateway apparatus of the third exemplary embodiment of the present invention.

FIG. 7 shows the configuration in the direction from the IMS network 140 to the mobile circuit switching network 130 in the present exemplary embodiment. In FIG. 7, the same reference numbers are given to elements same as those in FIG. 3. Referring to FIG. 7, the gateway apparatus 110 of the present exemplary embodiment is different from the configuration shown in FIG. 3 in that the audio transcoder 190 is provided between the jitter buffer unit 177 and the protocol conversion unit 175.

In FIG. 7, the audio transcoder 190 performs conversion of audio compression encoding scheme based on a conversion instruction from the control and analysis unit 172. Here, as an example, it is assumed that the portable terminal 120 on the mobile circuit switching network 130 side is equipped with an AMR codec and the portable terminal 150 (or the portable terminal 155) is equipped with a G.711 codec. In this case, the audio transcoder 190 performs conversion of audio compression encoding scheme between AMR and G.711.

In the present exemplary embodiment, other known codecs, in addition to AMR and G.711 mentioned above, can be used as the audio codec used for generating a compression encoded audio bit stream. Further, the control and analysis unit 172 is arranged within the conversion unit 250, however, it may be provided inside the call control unit 160.

The call control unit 160 and the conversion unit 250 may be implemented separately in difference apparatuses. In such a configuration, for example, the ITU-T H. 248 Megaco protocol can be used for the exchange of control signals between the call control unit 160 and the conversion unit 250.

It is nodded that the gateway apparatus in FIG. 5 may be configured in a way that the audio transcoder 190 is arranged between the protocol conversion unit 200 and the jitter buffer unit 177 and the control and analysis unit 172 supplies a control signal to the audio transcoder 190, as shown in FIG. 7. In FIG. 7, the processing and functions of the call control unit 160 and the conversion unit 250 (the control and analysis unit 172, the protocol conversion unit 175, the audio transcoder 190, the jitter buffer unit 177, and the packet reception unit 179) may be implemented by a program executed by a computer constituting the gateway apparatus 110.

According to each exemplary embodiment described above, the following effects can be obtained.

A voice telephone service that has been implemented on a mobile circuit switching network can be implemented on an IMS network. In other words, an interconnection of circuit switching protocol frame signals and packet signals of the IMS network can be realized and voice communication can be maintained.

According to the gateway apparatus according to the present invention, when a terminal moves thereby moving its location, problems, such as the audio heard by the terminal becoming intermittent, increased delays, or excess noise, that occur due to discontinuous transmission of voice packets and transmission of excess packets after the movement of the terminal can be solved and clean voice communication can be achieved.

Further, even in case the terminals use different audio compression encoding schemes, the gateway apparatus perform audio compression encoding conversion and the interconnection of voice communication between the terminals can be implemented with no need to remodel the terminals.

Further, the present invention can be applied not only to a gateway apparatus that is arranged between a mobile circuit switching network and an IMS (IP Multimedia Subsystem) network described in the exemplary embodiments above, but also to a gateway apparatus that is arranged between, for example, a mobile high-speed network and a mobile circuit switching network. Here, the mobile high-speed network is for example a network including at least one of the following: LTE (Long Term Evolution), EPC (Evolved Packet Core), UMB (Ultra Mobile Broadband), HSDPA (High Speed Downlink Packet Access), HSPA (High Speed Packet Access), and WiMax. The following describes exemplary embodiments of a gateway apparatus that is arranged between a mobile high-speed network and a mobile circuit switching network, and that performs mutual conversion between a circuit switching protocol and a packet protocol to perform voice communication.

[Exemplary Embodiment 4]

Figure 8:
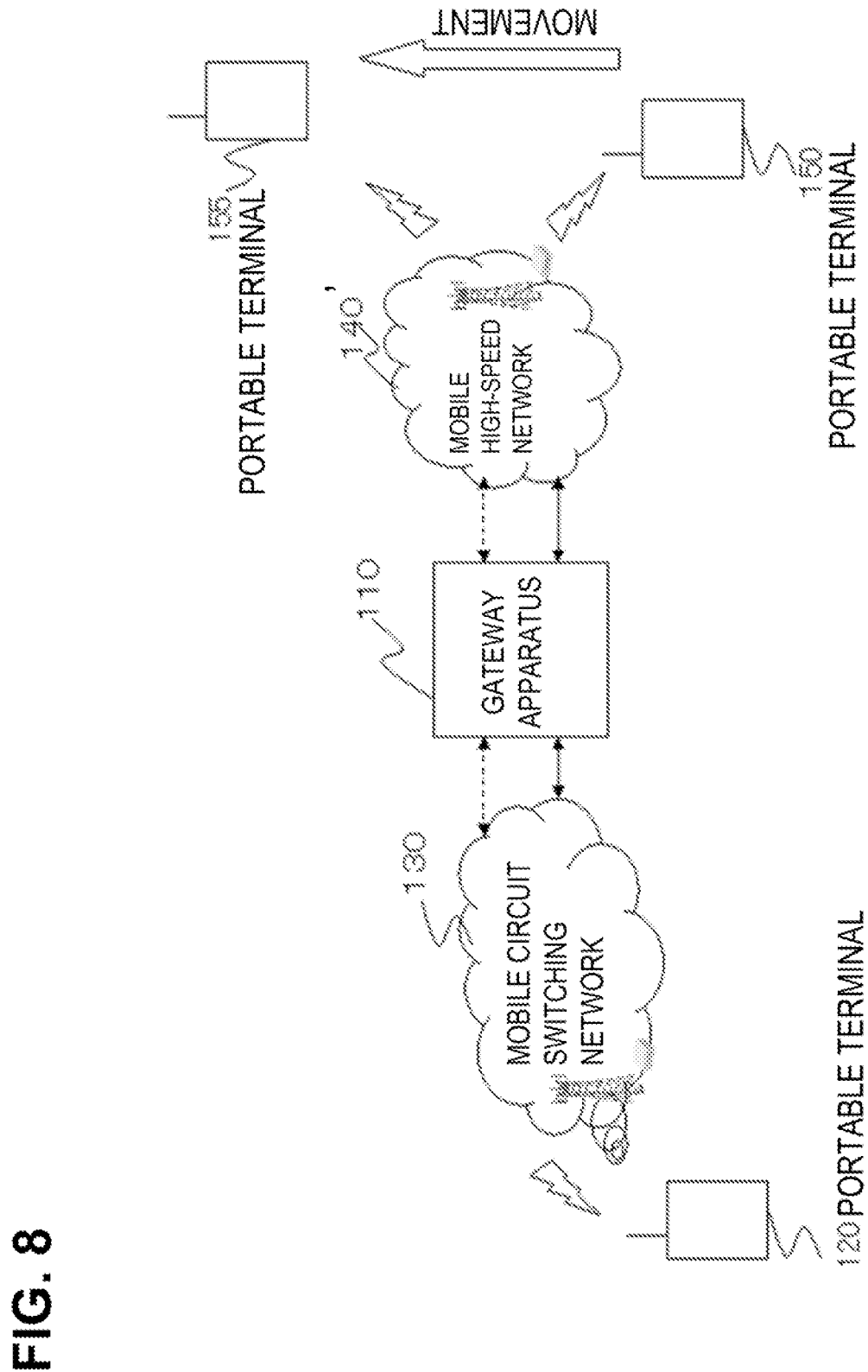
FIG. 8 is a diagram illustrating a system configuration of a fourth exemplary embodiment of the present invention.

FIG. 8 is a diagram illustrating the network configuration and topology of a gateway apparatus of the first exemplary embodiment of the present invention. In FIG. 8, the portable terminal 120 is an existing voice telephone terminal connected to a mobile circuit switching network. The portable terminal 120 is connected to the mobile circuit switching network 130, is equipped with for example the AMR (Adaptive Multi-Rate) audio codec, and transmits/receives a bit stream obtained by performing compression encoding of an audio signal at a bit rate of 12.2 kbps (kilobit per second). As for details of the AMR audio codec, reference can be made to, for example, the 3GPP (The Third Generation Partnership Project) TS26.090 standard.

In the mobile circuit switching network 130, a base station NodeB and a radio network control unit (RNC (Radio Network Controller) transmit/receive an AMR stream in a format stored in the IuUP (Iu User Plane) line switching protocol. Further, as a call processing signal, a call processing signal used in the mobile circuit switching network is output. As for details of the IuUP protocol, refer to the 3GPP TS25.415 standard.

The portable terminal 150 denotes a VoIP voice terminal connected to a mobile high-speed network 140' based on IP (for example LTE, EPC, UMB, HSDPA, HSPA or mobile WiMax).

The portable terminal 150 is, equipped with for example, the AMR (Adaptive Multi-Rate) audio codec and generates a bit stream obtained by performing compression encoding of an audio signal at a bit rate of, for example, 12.2 kbps. Further, the portable terminal 150 stores this bit stream in RTP (Real-time Transport Protocol), connects to the mobile high-speed network 140' after generating an RTP packet, and transmits/receives the RTP packet on UDP (User Datagram Protocol)/IP (Internet Protocol). Here, when the AMR bit stream is RTP-packetized, an RTP payload format is necessary, and for details, one can refer to the IETF (The Internet Engineering Task Force) RFC 3267 standard, for example. Further, for function details of such a VoIP terminal, reference can be made to the 3GPP TS 26.114 standard.

The gateway apparatus 110 is connected to both the mobile circuit switching network 130 and the mobile high-speed network 140' and interconnects voice communication between the two. In other words, the interconnection is performed by converting both call control signals and protocols relating to audio data. More specifically, when the mobile high-speed network 140' is EPC or LTE, for example, the gateway apparatus 110 exchanges call control signals and packets with PGW or PDN-GW (Packet Data Network Gateway). Between the gateway apparatus 110 and the mobile circuit switching network 103, the gateway apparatus 110 exchanges call control signals and audio signals with MSC (Mobile Switching Center), for example. As for details of PDN-GW, one can refer to the 3GPP TS 23.401 standard, for example.

FIG. 8 shows a configuration of a situation in which the portable terminals 150 and 120 were originally performing voice communication, then the portable terminal 150 moves on the mobile high-speed network 140' to change its location, and becomes one indicated by a reference numeral 155, as a matter of convenience, while the voice communication between the portable terminals 155 and 120 still continues after the movement of the portable terminal 150.

The configuration of the gateway apparatus 110 of the fourth exemplary embodiment of the present invention is identical to FIGS. 2 and 3. FIG. 2 shows the configuration in case audio data is transferred in the direction from the mobile circuit switching network 130 to the mobile high-speed network 140'. Referring to FIG. 2, the gateway apparatus 110 comprises the call control unit 160 and the conversion unit 170. The conversion unit 170 comprises the control and analysis unit 172, the protocol conversion unit 175, the SN (Sequence Number)/TS (Time Stamp) changing unit 178, and the packetizing unit 176.

FIG. 3 shows the configuration in case audio data is transferred in the direction from the mobile high-speed network 140' to the mobile circuit switching network 130. Referring to FIG. 3, the conversion unit 170 comprises the control and analysis unit 172, the protocol conversion unit 175, the jitter buffer unit 177, and the packet reception unit 179. In FIGS. 2 and 3, the processing and functions of the call control unit 160 and the conversion unit 170 (the control and analysis unit 172, the protocol conversion unit 175, the SN/TS changing unit 178, the packetizing unit 176, the jitter buffer unit 177, and the packet reception unit 179) may be implemented by a program executed by a computer constituting the gateway apparatus 110.

The following described the configuration in the direction from the mobile circuit switching network 130 to the mobile high-speed network 140' with reference to FIGS. 8 and 2. In FIG. 2, the call control unit 160 receives a call control signal (for example SIP (Session Initiation Protocol) or SDP (Session Description Protocol) signal) from the mobile high-speed network 140', converts the received signal into a circuit switching call control signal, and outputs the resulting signal to the mobile circuit switching network 130.

The call control unit 160 performs reverse conversion by converting a circuit switching call control signal received from the mobile circuit switching network 130 into for example a SIP or SDP signal and outputs the converted signal to the mobile high-speed network 140'. As for details of SIP and SDP, reference can be made to, for example, IFTF RFC 3261 and RFC 2327, respectively.

The call control unit 160 receives information regarding the location of the portable terminal 150 and decides whether or not the IP address of a packet of a corresponding channel transmitted from the gateway apparatus to the mobile high-speed network 140' changes due to the movement of the portable terminal 150.

When an IP address of the packet of the corresponding channel changes, the call control unit 160 outputs an instruction to change a destination IP address to the packetizing unit 176 and outputs a movement completion notification to the SN (Sequence Number)/TS (Time Stamp) changing unit 178.

The call control unit 160 outputs required information out of information included in the call control signal received from the mobile circuit switching network 130 and information included in the SIP or SDP signal received from the mobile high-speed network 140' to the control and analysis unit 172 in the conversion unit 170 for each channel.

The control and analysis unit 172 compares the information of each channel received from the call control unit 160 and decides whether or not protocol conversion is necessary, and when protocol conversion is needed, the control and analysis unit 172 outputs conversion information indicating what kind of conversion will be performed to the protocol conversion unit 175 for each channel.

The protocol conversion unit 175 receives an IuUP circuit switching protocol from the mobile circuit switching network 130 and reads a compression encoded audio bit stream stored in the protocol. Here, the compression, encoded audio bit stream is a bit stream compression encoded in accordance with AMR.

Further, the protocol conversion unit 175 receives the conversion information from the control and analysis unit 712 for each channel. When protocol conversion is needed, according to the conversion information, the protocol conversion unit 175 constructs an RTP payload format header, as specified in IETF RFC 3267, for example, for each channel, and stores the AMR compression encoded bit stream in the payload.

Here, since frame type information included in the AMR compression encoded bit stream indicates a bit rate, the protocol conversion unit 175 converts it into codec mode request (CMR) information as specified in RFC 3267.

Further, the protocol conversion unit 175 sets octet alignment and other needed parameters to predetermined values according to RFC 3267.

When the portable terminal 150 moves and changes the IP address, the SN/TS changing unit 178 receives the movement completion notification from the control and analysis unit 172, holds SN (Sequence Number) or TS (Time Stamp) at a timing immediately before the movement, and changes (re-allots) SN or TS after the movement completion notification so that SN or TS of an RTP packet sent to a different IP address at the time of the movement completion notification continuously varies from the aforementioned SN or TS held.

The packetizing unit 176 receives information on the RTP payload format from the protocol conversion unit 175 and stores it in the RTP packet. Further, in case the portable terminal 150 moves and the IP address is changed, the packetizing unit 176 receives a changed IP address from the control and analysis unit 172 while using the same IP address when it does not change, and transmits an RTP/UDP/IP to the IP address.

The following describes the configuration in the direction from the mobile high-speed network 140' to the mobile circuit switching network 130 with reference to FIGS. 8 and 3. The call control unit 160 receives information regarding the location of the portable terminal 150 and decides whether or not the source IP address of a packet of a corresponding channel received from the mobile high-speed network 140' changes due to the movement of the portable terminal 150.

When the source IP address of the packet of the corresponding channel changes, the call control unit 160 outputs an instruction to change the source IP address to the packet reception unit 179 and outputs a movement completion notification to the jitter buffer unit 177.

The packet reception unit 179 receives a packet from the mobile high-speed network 140'. When a source IP address is changed due to the movement of the portable terminal 150, the packet reception unit 179 receives a changed IP address from the control and analysis unit 172 and receives an RTP/UDP/IP packet after switching the route of the receiving node.

The jitter buffer unit 177 receives the RTP packet from the packet reception unit 179. The jitter buffer unit 177 eliminates jitter (a variation of delay) from the RTP packet. When the portable terminal 150 moves and the IP address is changed, the jitter buffer unit 177 receives the movement completion notification from the control and analysis unit 172, and receives the RTP packet from the packet reception unit 179 at the reception of the movement completion notification after clearing the content of at least one of the following: the jitter buffer, RTP Time Stamp, and RTP Sequence Number.

In the above exemplary embodiment, other known codecs such as AMR-WB and G.711, in addition to AMR mentioned above, can be used as the audio codec used for generating a compression encoded audio bit stream. RTP is used as the protocol of packets exchanged with the mobile high-speed network, however, other protocols (for example GTP-U) may be used.

Further, the control and analysis unit 172 is arranged within the conversion unit 170, however, it may be provided inside the call control unit 160.

Further, the call control unit 160 and the conversion unit 170 may be implemented separately in difference apparatuses. In such a configuration, for example, the ITU-T H. 248 Megaco protocol can be used for the exchange of control signals between the call control unit 160 and the conversion unit 170.

[Exemplary Embodiment 5]

Figure 9:
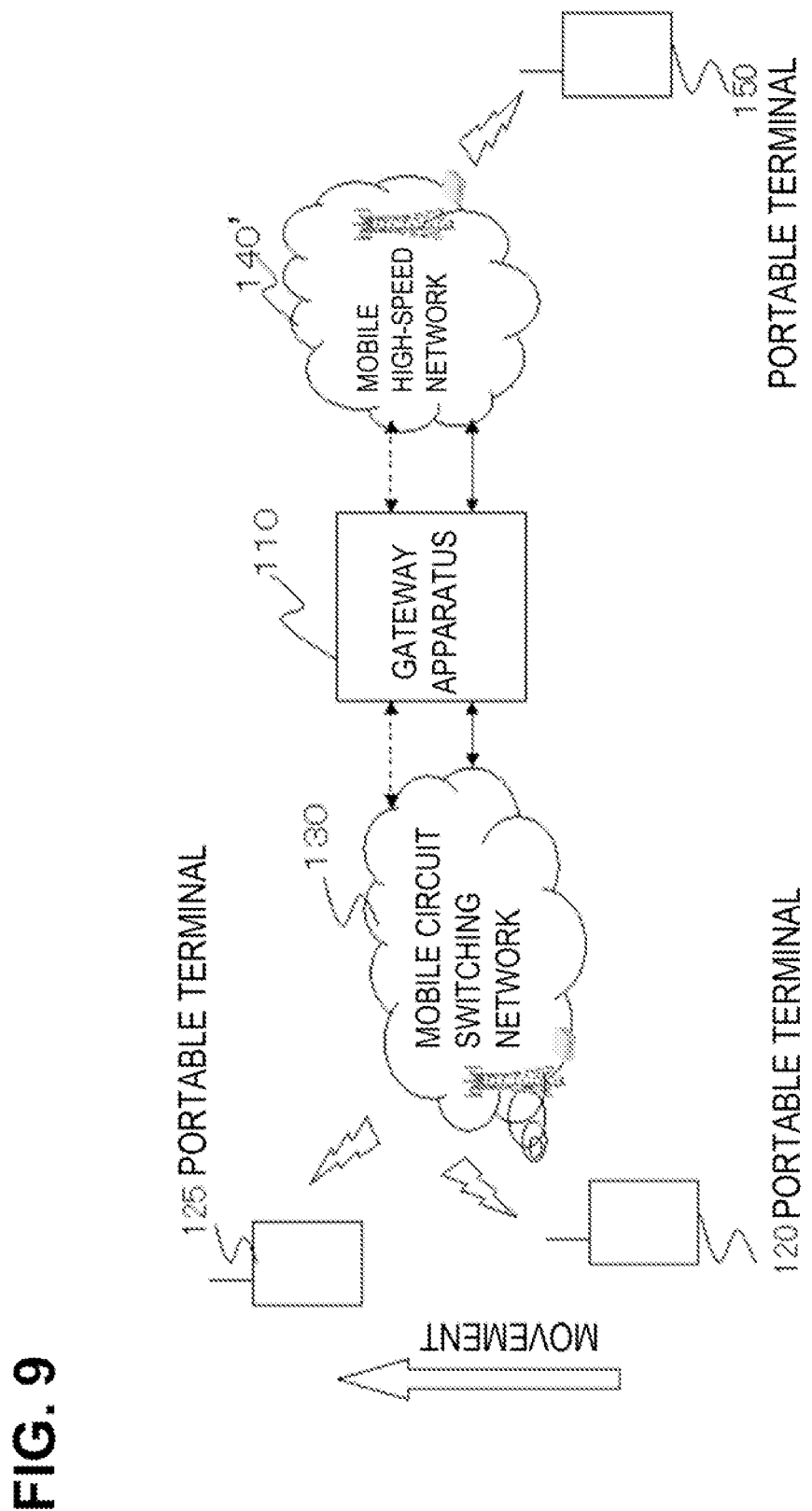
FIG. 9 is a diagram illustrating a system configuration of a fifth exemplary embodiment of the present invention.

Next, a fifth exemplary embodiment of the present invention will be described. FIG. 9 is a diagram illustrating the configuration of the fifth exemplary embodiment of the present invention. In FIG. 9, since the same reference numbers are given to elements same as those in FIG. 8 and the identical elements operate identically as described using FIG. 8, the explanation of them will be omitted.

In FIG. 9, it is assumed that the portable terminal 120 moves its location on the mobile circuit switching network 130 to the position of a portable terminal 125. In this case, the gateway apparatus 110 needs to send the IuUP circuit switching protocol to the mobile circuit switching network 130 through different routes before and after the movement of the portable terminal 120.

The configuration of the gateway apparatus 110 of the present exemplary embodiment (the configuration in the direction from the mobile high-speed network 140' to the mobile circuit switching network 130) is identical to FIG. 5. Further, in the present exemplary embodiment, the configuration in the direction from the mobile circuit switching network 130 to the mobile high-speed network 140' is identical to FIG. 2.

In FIG. 5, the same reference numbers are given to elements same as those in FIG. 3. Since the elements having the same reference numbers operate identically to the corresponding elements in FIG. 3, the explanation of them will be omitted.

Referring to FIG. 5, in the present exemplary embodiment, the control and analysis unit 172 outputs a movement completion notification of the portable terminal 120 to the jitter buffer unit 177 and the protocol conversion unit 200.

The protocol conversion unit 200 converts the protocol of a packet into the IuUP protocol to be output to the mobile circuit switching network 130 in such a manner that the frame number included in the IuUP protocol is made to vary continuously.

More specifically, the protocol conversion unit 200 stores at least a frame number preceding by one in the memory (not shown in the diagram).

When receiving the movement completion notification from the control and analysis unit 172, the protocol conversion unit 200 checks an IuUP frame number immediately after the movement completion notification has been received and confirms that it is continuously varying from the frame number, stored in the memory, immediately before the movement completion notification was received. If it is not varying continuously (for example the frame number goes back in time or the frame numbers have the same value, etc.), the protocol conversion unit 200 sends the IuUP protocol to the mobile circuit switching network 130 after performing re-allotment processing so that the frame number is continuous.

In the fifth exemplary embodiment of the present invention, other known codecs, in addition to AMR and G.711 mentioned above, can be used as the audio codec used for generating a compression encoded audio bit stream. RTP is used as the protocol of packets exchanged with the mobile high-speed network, however, other protocols (for example GTP-U) may be used.

The control and analysis unit 172 is arranged within a conversion unit 270, however, it may be provided inside the call control unit 160.

The call control unit 160 and the conversion unit 270 may be implemented separately in difference apparatuses. In such a configuration, for example, the ITU-T H. 248 Megaco protocol can be used for the exchange of control signals between the call control unit 160 and the conversion unit 270. In FIG. 5, the processing and functions of the call control unit 160 and the conversion unit 270 (the control and analysis unit 172, the protocol conversion unit 200, the jitter buffer unit 177, and the packet reception unit 179) may be implemented by a program executed by a computer constituting the gateway apparatus 110.

[Exemplary Embodiment 6]

The following describes a sixth exemplary embodiment of the present invention will be described. In the present exemplary embodiment, the portable terminal 120 and the portable terminal 150 (the portable terminal 155) use different audio compression encoding schemes in the configuration of FIG. 8. As a result, the configuration of the gateway apparatus 110 is different from the configuration shown in FIG. 2. The gateway apparatus 110 of the present invention is configured as shown in FIG. 6.

In FIG. 6, the audio transcoder 190 is added between the protocol conversion unit 175 and the SN/TS changing unit 178 in the conversion unit 250. Other than the audio transcoder 190, the configuration in FIG. 6 is identical to FIG. 2.

The audio transcoder 190 performs conversion of audio compression encoding scheme based on a conversion instruction from the control and analysis unit 172. Here, as an example, it is assumed that the portable terminal 120 on the mobile circuit switching network 130 side has AMR installed and the portable terminal 150 (or the portable terminal 155) on the mobile high-speed network 140' side has G.711 installed. In this case, the audio transcoder 190 performs conversion of audio compression encoding scheme between AMR and G.711.

In the sixth exemplary embodiment of the present invention, other known codecs, in addition to AMR and G.711 mentioned above, can be used as the audio codec used for generating a compression encoded audio bit stream. Further, RTP is used as the protocol of packets exchanged with the mobile high-speed network, however, other protocols (for example GTP-U) may be used.

The control and analysis unit 172 is arranged within the conversion unit 250, however, it may be provided inside the call control unit 160.

The call control unit 160 and the conversion unit 250 may be implemented separately in difference apparatuses. In such a configuration, for example, the ITU-T H. 248 Megaco protocol can be used for the exchange of control signals between the call control unit 160 and the conversion unit 250.

In FIG. 6, the processing and functions of the call control unit 160 and the conversion unit 250 (the control and analysis unit 172, the protocol conversion unit 175, the audio transcoder 190, the SN/TS changing unit 178, and the packetizing unit 176) may be implemented by a program executed by a computer constituting the gateway apparatus 110.

In the present exemplary embodiment, the configuration of the gateway apparatus in the direction from the mobile high-speed network 140' to the mobile circuit switching network 130 is the same as the configuration shown in FIG. 7.

Referring to FIG. 7, the gateway apparatus 110 of the present exemplary embodiment comprises the audio transcoder 190 between the jitter buffer unit 177 and the protocol conversion unit 175.

The audio transcoder 190 performs conversion of audio compression encoding scheme based on a conversion instruction from the control and analysis unit 172. Here, as an example, it is assumed that the portable terminal 120 on the mobile circuit switching network 130 side has AMR installed and the portable terminal 150 (or the portable terminal 155) on the mobile high-speed network 140' side has G.711 installed. In this case, the audio transcoder 190 performs conversion of audio compression encoding scheme between AMR and G.711.

In the sixth exemplary embodiment of the present invention, other known codecs, in addition to AMR and G.711 mentioned above, can be used as the audio codec used for generating a compression encoded audio bit stream.

In the present exemplary embodiment, RTP is used as the protocol of packets exchanged with the mobile high-speed network, however, other protocols (for example GTP-U) may be used.

The control and analysis unit 172 is arranged within the conversion unit 250, however, it may be provided inside the call control unit 160.

The call control unit 160 and the conversion unit 250 may be implemented separately in difference apparatuses. In such a configuration, for example, the ITU-T H. 248 Megaco protocol can be used for the exchange of control signals between the call control unit 160 and the conversion unit 250. In FIG. 7, the processing and functions of the call control unit 160 and the conversion unit 250 (the control and analysis unit 172, the protocol conversion unit 175, the audio transcoder 190, the jitter buffer unit 177, and the packet reception unit 179) may be implemented by a program executed by a computer constituting the gateway apparatus 110.

According to the fourth to the sixth exemplary embodiments described above, the following effects can be obtained.

It becomes possible to interconnect between a portable terminal connected to a mobile circuit switching network and a VoIP terminal connected to a mobile high-speed network, and the interconnection of voice communication can be implemented with any combination without remodeling the terminals.

Even in case the terminals use different audio compression encoding schemes, by having the gateway apparatus perform audio compression encoding conversion, the interconnection of voice communication can be implemented without remodeling the terminals.

Further, when a terminal moves thereby moving its location, problems, such as the audio heard by the terminal becoming intermittent, increased delays, or excess noise, that occur due to discontinuous transmission of voice packets and transmission of excess packets after the movement of the terminal can be solved and clean voice communication can be achieved.

It should be noted that other objects, features and aspects of the present invention will become apparent in the entire disclosure and that modifications may be done without departing the gist and scope of the present invention as disclosed herein and claimed as appended herewith.

Also it should be noted that any combination of the disclosed and/or claimed elements, matters and/or items may fall under the modifications aforementioned.

The whole or part of the exemplary embodiments disclosed above can be described as, but not limited to, the following supplementary notes.

(Supplementary Note 1)

A gateway apparatus that is arranged between a mobile circuit switching network and an IMS (IP Multimedia Subsystem) network and performing mutual conversion between a circuit switching protocol and an IMS protocol to perform voice communication, wherein the apparatus comprises means that exercises control such that at least one of a sequence number and a timestamp in a packet output to the IMS network is made to vary continuously before and after the movement of a terminal, in case the terminal connected to another network beyond the IMS network side moves its location.

(Supplementary Note 2)

A gateway apparatus that is arranged between a mobile circuit switching network and an IMS (IP Multimedia Subsystem) network and performing mutual conversion between a circuit switching protocol and an IMS protocol to perform voice communication, wherein the apparatus comprises means that controls so as to receive a packet after clearing content of at least one:
a reception buffer that receives the packet,
a jitter buffer,
a timestamp, and
a sequence number, at the completion of the movement of a terminal, in case the terminal connected to another network beyond the IMS network side moves its location when the packet is received from the IMS network, and is converted into the circuit switching protocol and the converted protocol is output to the mobile circuit switching network.

(Supplementary Note 3)

A gateway apparatus that is arranged between a mobile circuit switching network and an IMS (IP Multimedia Subsystem) network and performing mutual conversion between a circuit switching protocol and an IMS protocol to perform voice communication, wherein the apparatus comprises means that exercises control such that at least one of a sequence number and a timestamp of a packet in the packet output to the IMS network is made to vary continuously before and after the movement of a terminal, in case the terminal connected to the mobile circuit switching network moves its location on the mobile circuit switching network.

(Supplementary Note 4)

A gateway apparatus that is arranged between a mobile circuit switching network and an IMS (IP Multimedia Subsystem) network and performing mutual conversion between a circuit switching protocol and an IMS protocol to perform voice communication, wherein the apparatus comprises means that exercises control such that a number of a frame on an IuUP (Iu User Plane) protocol output to the mobile circuit switching network is made to vary continuously before and after movement of a terminal, in case the terminal connected to the mobile circuit switching network moves its location on the mobile circuit switching network.

(Supplementary Note 5)

The gateway apparatus according to any one of Supplementary notes 1 to 4, wherein the apparatus performs audio compression encoding conversion, when the terminal connected to the mobile circuit switching network and the terminal connected to another network beyond the IMS network side have audio compression encoding schemes different from each other.

(Supplementary Note 6)

A gateway method that performs mutual conversion between a circuit switching protocol and an IMS (IP Multimedia Subsystem) protocol to perform voice communication between a mobile circuit switching network and an IMS network, wherein the method comprises exercising control such that at least one of a sequence number and a timestamp in a packet output to the IMS network is made to vary continuously before and after the movement of a terminal, in case the terminal connected to another network beyond the IMS network side moves its location.

(Supplementary Note 7)

A gateway method that performs mutual conversion between a circuit switching protocol and an IMS (IP Multimedia Subsystem) protocol to perform voice communication between a mobile circuit switching network and an IMS network, wherein the method comprises exercising control to receive a packet after clearing content of at least one of:
a reception buffer that receives the packet,
a jitter buffer,
a timestamp, and
a sequence number, at the completion of the movement of a terminal, in case the terminal connected to another network beyond the IMS network side moves its location when a gateway receives the packet from the IMS network, converts the packet into the circuit switching protocol and outputs the converted protocol to the mobile circuit switching network.

(Supplementary Note 8)

A gateway method that performs mutual conversion between a circuit switching protocol and an IMS (IP Multimedia Subsystem) protocol to perform voice communication between a mobile circuit switching network and an IMS network, wherein the method comprises exercising control such that at least one of a sequence number and a timestamp in a packet output to the IMS network is made to vary continuously before and after the movement of a terminal, in case the location of the terminal connected to the mobile circuit switching network side moves its location on the mobile circuit switching network.

(Supplementary Note 9)

A gateway method that performs mutual conversion between a circuit switching protocol and an IMS (IP Multimedia Subsystem) protocol to perform voice communication between a mobile circuit switching network and an IMS network, wherein the method comprises exercising control such that a number a frame on an IuUP (Iu User Plane) protocol output to the mobile circuit switching network is made to vary continuously before and after the movement of terminal, in case the terminal connected to the mobile circuit switching network moves its location on the mobile circuit switching network.

(Supplementary Note 10)

The gateway method according to any one of Supplementary notes 5 to 9, wherein the method comprises performing audio compression encoding conversion when the terminal connected to the mobile circuit switching network and the terminal connected to another network beyond the IMS network side have audio compression encoding schemes different from each other.

(Supplementary Note 11)

A program that causes a computer constituting a gateway apparatus that is arranged between a mobile circuit switching network and an IMS (IP Multimedia Subsystem) network and performing mutual conversion between a circuit switching protocol and an IMS protocol to perform voice communication to execute the processing comprising:

controlling at least one of a sequence number and a timestamp in a packet output to the IMS network to vary continuously before and after the movement of a terminal, in case the terminal connected to another network beyond the IMS network side moves its location.

(Supplementary Note 12)

A program that causes a computer constituting a gateway apparatus that is arranged between a mobile circuit switching network and an IMS (IP Multimedia Subsystem) network and performing mutual conversion between a circuit switching protocol and an IMS protocol to perform voice communication to execute the processing comprising: controlling to receive a packet after clearing content of at least one:

a reception buffer that receives the packet, a jitter buffer, a timestamp, and a sequence number, at the completion of the movement of a terminal, in case the terminal connected to another network beyond the IMS network side moves its location when the gateway apparatus receives the packet from the IMS network, converts the packet into the circuit switching protocol and outputs the converted protocol to the mobile circuit switching network.

(Supplementary Note 13)

A program that causes a computer constituting a gateway apparatus that is arranged between a mobile circuit switching network and an IMS (IP Multimedia Subsystem) network and that performs mutual conversion between a circuit switching protocol and an IMS protocol to perform voice communication to execute the processing comprising controlling at least one of a sequence number and a timestamp in a packet output to the IMS network to vary continuously before and after the movement of a terminal, in case the terminal connected to the mobile circuit switching network moves its location on the mobile circuit switching network.

(Supplementary Note 14)

A program that causes a computer constituting a gateway apparatus that is arranged between a mobile circuit switching network and an IMS (IP Multimedia Subsystem) network and that performs mutual conversion between a circuit switching protocol and an IMS protocol to perform voice communication to execute the processing comprising controlling a number a frame on an IuUP (Iu User Plane) protocol output to the mobile circuit switching network to vary continuously before and after movement of a terminal, in case the terminal connected to the mobile circuit switching network moves its location on the mobile circuit switching network.

(Supplementary Note 15)

The program according to any one of Supplementary notes 11 to 14, causing the computer to execute the processing comprising performing audio compression encoding conversion when the terminal connected to the mobile circuit switching network and the terminal connected to another network beyond the IMS network side have audio compression encoding schemes different from each other.

(Supplementary Note 16)

The gateway apparatus according to Supplementary note 1, wherein the apparatus comprises:

a call control unit and a conversion unit;

the conversion unit, comprising;

a control and analysis unit;

a protocol conversion unit that performs protocol conversion between the IMS network and the mobile circuit switching network;

a sequence number/timestamp changing unit that changes the a sequence number and a timestamp changes of the packet to the IMS network;

a packetizing unit that packetizes transmission data;

a packet reception unit that receives a reception packet from the IMS network; and a jitter buffer unit that eliminates a variation of delay from the reception packet, the call control unit converting a call control signal received from one of the IMS network or the mobile circuit switching network into a call control signal of the other network and outputting the converted signal to the other network, the call control unit receiving information regarding the location of the terminal and deciding whether or not the IP address of a packet of a corresponding channel transmitted from the gateway apparatus to the IMS network changes due to the movement of the terminal, the call control unit outputting an instruction to change a destination IP address to the packetizing unit and outputting a movement completion notification to the sequence number/timestamp changing unit, when the IP address of the packet of the corresponding channel changes; and the call control unit further outputting information on the call control signal received from the mobile circuit switching network and the IMS network to the control and analysis unit of the conversion unit, the control and analysis unit deciding whether or not protocol conversion is necessary based on the information received from the call control unit, and outputting conversion information to the protocol conversion unit for each channel when protocol conversion is needed, the sequence number/timestamp changing unit holding a sequence number or timestamp preceded by one, receiving the movement completion notification from the control and analysis unit, and setting so that a sequence number or timestamp of a packet sent to a different IP address at the time of the movement completion notification continuously varies from the sequence number or timestamp held when the terminal moves and changes the IP address; and the packetizing unit receiving a changed IP address from the control and analysis unit and transmitting a packet to the IP address when the terminal moves and changes the IP address.

(Supplementary Note 17)

The gateway apparatus according to Supplementary note 16, wherein the call control unit receives information regarding the location of the terminal and decides whether or not a source IP address of a packet of a corresponding channel received from the IMS network side changes due to the movement of the terminal, the call control unit outputs an instruction to change the source IP address to the packet reception unit and outputs a movement completion notification to the jitter buffer unit when the source IP address changes, the packet reception unit receives a packet from the IMS network, and when the source IP address is changed due to the movement of the terminal, the packet reception unit receives a changed IP address from the control and analysis unit and receives a packet after switching the route of the receiving node, and the jitter buffer unit receives the packet from the packet reception unit, and when the terminal moves and the IP address is changed, the jitter buffer unit receives the movement completion notification from the control and analysis unit, receives the packet from the packet reception unit at the reception of the movement completion notification after clearing content of at least one of the jitter buffer unit, the timestamp, and the sequence number, and outputs the packet to the protocol conversion unit.

(Supplementary Note 18)

The gateway apparatus according to Supplementary note 16, wherein the protocol conversion unit converts the protocol of a packet received from the IMS network into the IuUP (Iu User Plane) protocol to be output to the mobile circuit switching network, the control and analysis unit outputs a movement completion notification to the jitter buffer unit and the protocol conversion unit, in case the terminal connected to the mobile circuit switching network moves its location on the mobile circuit switching network, when receiving the movement completion notification from the control and analysis unit, the protocol conversion unit checks an IuUP frame number immediately, after the movement completion notification is received and confirms that the IuUP frame number is continuously varying from the frame number immediately before the movement completion notification was received, and if the IuUP frame number is not varying continuously, the protocol conversion unit sends the IuUP protocol to the mobile circuit switching network, after performing re-allotment processing so that the IuUP frame number is continuous.

(Supplementary Note 19)

The gateway apparatus according to Supplementary note 16, wherein the apparatus comprises an audio transcoder that performs conversion of audio compression encoding scheme between the protocol conversion unit and the sequence number/timestamp changing unit.

(Supplementary Note 20)

The gateway apparatus according to Supplementary note 19, wherein the apparatus comprises an audio transcoder that performs conversion of audio compression encoding scheme between the jitter buffer unit and the protocol conversion unit.

(Supplementary Note 21)

A gateway apparatus that is arranged between a mobile high-speed network and a mobile circuit switching network and performs mutual conversion between a circuit switching protocol and a packet protocol to perform voice communication, wherein the apparatus comprises:

means that exercises control such that at least one of a sequence number and a timestamp packet output to the mobile high-speed network is made to vary continuously before and after movement of a terminal, in case the terminal connected to the mobile high-speed network moves its location on the mobile high-speed network.

(Supplementary Note 22)

A gateway apparatus that is arranged between a mobile high-speed network and a mobile circuit switching network and performs mutual conversion between a circuit switching protocol and a packet protocol to perform voice communication, wherein the apparatus comprises means that exercises control to receive a packet after clearing content of at least one:
a reception buffer that receives the packet from a terminal,
a timestamp, and
a sequence number at the completion of the movement of the terminal, when the packet is received from the mobile high-speed network, the protocol is converted, and the converted protocol is output to the mobile circuit switching network, in case the terminal connected to the mobile high-speed network moves its location on the mobile high-speed network.

(Supplementary note 23)

A gateway apparatus that is arranged between a mobile high-speed network and a mobile circuit switching network and performs mutual conversion between a circuit switching protocol and a packet protocol to perform voice communication, wherein the apparatus comprises means that exercises control such that a number of a frame on the circuit switching protocol output to the mobile circuit switching network is made to vary continuously before and after the movement of a terminal, in case the terminal connected to the mobile circuit switching network moves its location on the mobile circuit switching network.

(Supplementary Note 24)

The gateway apparatus according to any one of Supplementary notes 21 to 23, wherein the apparatus performs audio compression encoding conversion when the terminals connected to the mobile circuit switching network and the mobile high-speed network have audio compression encoding schemes different from each other.

(Supplementary Note 25)

The gateway apparatus according to any one of Supplementary notes 21 to 24, wherein the mobile high-speed network is a network including at least one of: LTE (Long Term Evolution), EPC (Evolved Packet Core), UMB (Ultra Mobile Broadband), HSDPA (High Speed Downlink Packet Access), HSPA (High Speed Packet Access), and WiMax.

(Supplementary Note 26)

A gateway method that performs mutual conversion between a circuit switching protocol and a packet protocol to perform voice communication between a mobile high-speed network and a mobile circuit switching network, wherein the method comprises controlling at least one of a sequence number and a timestamp in a packet output to the mobile high-speed network to vary continuously before and after the movement of a terminal, in case the terminal connected to the mobile high-speed network moves its location on the mobile high-speed network.

(Supplementary Note 27)

A gateway method that performs mutual conversion between a circuit switching protocol and a packet protocol to perform voice communication between a mobile high-speed network and a mobile circuit switching network, wherein the method comprises controlling to receive a packet after clearing content of at least one of:
  a reception buffer that receives the packet from a terminal,
  a timestamp, and
  a sequence number, at the completion of the movement of the terminal, in case the terminal connected to the mobile high-speed network moves its location on the mobile high-speed network when a gateway receives the packet from the mobile high-speed network, converts the protocol, and outputs the converted protocol to the mobile circuit switching network.

(Supplementary Note 28)
A gateway method that performs mutual conversion between a circuit switching protocol and a packet protocol to perform voice communication between a mobile high-speed network and a mobile circuit switching network, wherein the method comprises
  controlling a number of a frame on the circuit switching protocol output to the mobile circuit switching network to vary continuously before and after movement of a terminal, in case the terminal connected to the mobile circuit switching network moves its location on the mobile circuit switching network.

(Supplementary Note 29)
The gateway method according to any one of Supplementary notes 26 to 28, wherein the method comprises
  performing audio compression encoding conversion when the terminals connected to the mobile circuit switching network and the mobile high-speed network have audio compression encoding schemes different from each other.

(Supplementary Note 30)
The gateway method according to any one of Supplementary notes 26 to 29, wherein the mobile high-speed network is a network including at least one of: LTE (Long Term Evolution), EPC (Evolved Packet Core), UMB (Ultra Mobile Broadband), HSDPA (High Speed Downlink Packet Access), HSPA (High Speed Packet Access), and WiMax.

(Supplementary Note 31)
A program that causes a computer constituting a gateway apparatus that is arranged between a mobile high-speed network and a mobile circuit switching network and that performs mutual conversion between a circuit switching protocol and a packet protocol to perform voice communication to execute the processing comprising:
  controlling at least one of a sequence number and a timestamp of a packet output to the mobile high-speed network to vary continuously before and after the movement of a terminal, in case the terminal connected to the mobile high-speed network moves its location on the mobile high-speed network.

(Supplementary Note 32)
A program that causes a computer constituting a gateway apparatus that is arranged between a mobile high-speed network and a mobile circuit switching network and that performs mutual conversion between a circuit switching protocol and a packet protocol to perform voice communication to execute the processing comprising:
  controlling to receive a packet after clearing content of at least one of:
    a reception buffer that receives the packet from a terminal,
    a timestamp, and
    a sequence number, at the completion of the movement of a terminal, in case the terminal connected to the mobile high-speed network moves its location on the mobile high-speed network when the gateway apparatus receives the packet from the mobile high-speed network, converts the protocol, and outputs the converted protocol to the mobile circuit switching network.

(Supplementary Note 33)
A program that causes a computer constituting a gateway apparatus that is arranged between a mobile high-speed network and a mobile circuit switching network and that performs mutual conversion between a circuit switching protocol and a packet protocol to perform voice communication to execute the processing comprising:
  controlling a number of a frame on the circuit switching protocol output to the mobile circuit switching network to vary continuously before and after movement of a terminal, in case the terminal connected to the mobile circuit switching network moves its location on the mobile circuit switching network.

(Supplementary Note 34)
The program according to any one of Supplementary notes 31 to 33, causing the computer execute the processing comprising
  performing audio compression encoding conversion when the terminals connected to the mobile circuit switching network and the mobile high-speed network have audio compression encoding schemes different from each other.

(Supplementary Note 35)
The program according to any one of Supplementary notes 31 to 34, wherein the mobile high-speed network is a network including at least one of: LTE (Long Term Evolution), EPC (Evolved Packet Core), UMB (Ultra Mobile Broadband), HSDPA (High Speed Downlink Packet Access), HSPA (High Speed Packet Access), and WiMax.

(Supplementary Note 36)
The gateway apparatus according to Supplementary note 21, wherein the apparatus comprises:
  a call control unit and a conversion unit; and
  the conversion unit, comprising;
  a control and analysis unit;
  a protocol conversion unit that performs protocol conversion between the mobile high-speed network and the mobile circuit switching network;
  a sequence number/timestamp changing unit that changes a sequence number and a timestamp changes of a packet;
  a packetizing unit that packetizes transmission data to the mobile high-speed network;
  a packet reception unit that receives a reception packet from the mobile high-speed network; and
  a jitter buffer unit that eliminates a variation of delay from the reception packet,
  the call control unit converting a call control signal received from one of the mobile high-speed network or the mobile circuit switching network into a call control signal of the other network and outputting the converted signal to the other network,
  the call control unit receiving information regarding the location of the terminal and deciding whether or not the IP address of a packet of a corresponding channel transmitted from the gateway apparatus to the mobile high-speed network side changes due to the movement of the terminal,
  the call control unit outputting an instruction to change a destination IP address to the packetizing unit and outputting a movement completion notification to the sequence number/timestamp changing unit when the packet of the corresponding channel changes; and
  the call control unit further outputting information on the call control signal received from the mobile circuit switching network and the mobile high-speed network to the control and analysis unit of the conversion unit, the control and analysis unit deciding whether or not protocol conversion is necessary based on the information received from the call control unit and outputting conversion information to the protocol conversion unit for each channel when protocol conversion is needed, the sequence number/timestamp changing unit holding a sequence number or timestamp preceding by one, receiving the movement completion notification from The control and analysis unit, and setting so that a sequence number or timestamp of a packet sent to a different IP address at the time of the movement completion notification continuously varies from the sequence number or timestamp held when the terminal moves and changes the IP address, and the packetizing unit receiving a changed IP address from the control and analysis unit and transmitting a packet to the IP address when the terminal moves and changes the IP address.

(Supplementary Note 37)

The gateway apparatus according to Supplementary note 36, wherein the call control unit receives information regarding the location of the terminal and decides whether or not the source IP address of a packet of a corresponding channel received from the mobile high-speed network side changes due to the movement of the terminal, the call control unit outputs an instruction to change the source IP address to the packet reception unit and outputs a movement completion notification to the jitter buffer unit when the source IP address changes, the packet reception unit receives a packet from the mobile high-speed network, and when the source IP address is changed due to the movement of the terminal, the packet reception unit receives a changed IP address from the control and analysis unit and receives a packet after switching the route of the receiving node, and the jitter buffer unit receives the packet from the packet reception unit, and when the terminal moves and the IP address is changed, the jitter buffer unit receives the movement completion notification from the control and analysis unit, receives the packet from the packet reception unit at the reception of the movement completion notification after clearing content of at least one of the jitter buffer unit, the timestamp, and the sequence number, and outputs the packet to the protocol conversion unit.

(Supplementary Note 38)

The gateway apparatus according to Supplementary note 36, wherein the protocol conversion unit converts the protocol of a packet received from the mobile high-speed network into an IuUP (Iu User Plane) protocol to be output to the mobile circuit switching network, the control and analysis unit outputs a movement completion notification to the jitter buffer unit and the protocol conversion unit when the terminal connected to the mobile circuit switching network moves its location on the mobile circuit switching network, when receiving the movement completion notification from the control and analysis unit, the protocol conversion unit checks an IuUP frame number immediately after the movement completion notification has been received and confirms that the IuUP frame number is continuously varying from the frame number immediately before the movement completion notification was received, and if the IuUP frame number is not varying continuously, the protocol conversion unit sends the IuUP protocol to the mobile circuit switching network after performing re-allotment processing so that the IuUP frame number is continuous.

(Supplementary Note 39)

The gateway apparatus according to Supplementary note 36, wherein the apparatus comprises an audio transcoder that performs conversion of audio compression encoding scheme between the protocol conversion unit and the sequence number/timestamp changing (Supplementary Note 40)

The gateway apparatus according to Supplementary note 39, wherein the apparatus comprises an audio transcoder that performs conversion of audio compression encoding scheme between the jitter buffer unit and the protocol conversion unit.

What is claimed is:

1. A gateway apparatus that is configured to be arranged between a mobile circuit switching network and a packet communication network, said apparatus comprising:
   a conversion unit configured to perform mutual conversion between a circuit switching protocol and a packet communication protocol to execute voice communication, wherein said conversion unit is configured to exercise control such that at least one of a sequence number and a timestamp in a packet destined to a first terminal and for output to said packet communication network, is configured to be made to vary continuously before and after movement of said first terminal, in case said first terminal connected to said packet communication network or another network beyond said packet communication network, moves the first terminal's location, and
   a call control unit configured to receive information regarding a location of said first terminal and deciding whether or not an IP address of a packet of a corresponding channel transmitted from said gateway apparatus to said packet communication network changes due to movement of said first terminal, wherein
   said call control unit is further configured to output an instruction to change a destination IP address to said packetizing unit and to output a movement completion notification to said sequence number/timestamp changing unit, when an IP address of said packet of said corresponding channel changes, and said call control unit is further configured to output information on a call control signal received from said mobile circuit switching network and said packet communication network to a control and analysis unit of said conversion unit.

2. The gateway apparatus according to claim 1, wherein said conversion unit includes:
   a reception buffer configured to receive the packet; and
   a jitter buffer configured to eliminate a variation of delay from the received packet, said conversion unit is further configured to exercise control to receive the packet after clearing at least one of: the reception buffer that receives said packet, the jitter buffer, the timestamp, and the sequence number, when movement of said first terminal is completed, and
   in case said first terminal moves the first terminal's location when on receipt of said packet from said packet communication network, said conversion unit converts said packet into a circuit switching protocol frame to output the circuit switching protocol frame.

3. The gateway apparatus according to claim 1, wherein said conversion unit is further configured to exercise control such that at least one of the sequence number and the timestamp in a packet destined to said first terminal and for output to said packet communication network, is configured to be made to vary continuously before and after movement of a second terminal which is connected to said mobile circuit switching network, the perform voice communication with said first terminal and moves the second terminal's location on said mobile circuit switching network.

4. The gateway apparatus according to claim 3, wherein said conversion unit is further configured to exercise control such that a number of a frame on said circuit switching protocol destined to said second terminal and output to said mobile circuit switching network is configured to be made to vary continuously before and after movement of said second terminal which is configured to move the second terminal's location on said mobile circuit switching network.

5. The gateway apparatus according to claim 3, wherein said conversion unit is configured to perform conversion of audio compression encoding scheme, in case said second terminal and said first terminal have audio compression encoding schemes different from each other.

6. The gateway apparatus according to claim 1, further comprising the call control unit, and wherein:
said conversion unit includes:
the control and analysis unit;
a protocol conversion unit configured to perform protocol conversion between said packet communication network and said mobile circuit switching network;
a sequence number/timestamp changing unit configured to change the sequence number and the timestamp of the packet to said packet communication network;
a packetizing unit configured to packetize transmission data;
a packet reception unit configured to receive a reception packet from said packet communication network; and
a jitter buffer unit configured to eliminate a variation of delay from a received packet,
said call control unit is further configured to convert a call control signal received from one of said packet communication network and said mobile circuit switching network into the call control signal of other network for output to said other network,
said control and analysis unit is further configured to decide whether or not protocol conversion is necessary, based on the information received from said call control unit, and to output conversion information to said protocol conversion unit for each channel, when protocol conversion is needed,
said sequence number/timestamp changing unit is further configured to hold the sequence number or timestamp preceding by one,
said sequence number/timestamp changing unit, when said first terminal moves and the IP address thereof is changed, is further configured to receive a movement completion notification from said control and analysis unit, and to set so that the sequence number or the timestamp in a packet which is configured to be sent to a different IP address, on receipt of the movement completion notification, is further configured to be continuously varied from said sequence number or the timestamp held, and
said packetizing unit is further configured to receive a changed IP address from said control and analysis unit and to transmit a packet to said changed IP address when said first terminal moves and changes the IP address.

7. The gateway apparatus according to claim 6, wherein:
said call control unit is further configured to receive information regarding a location of said first terminal and decides whether or not a source IP address of a packet of a corresponding channel received from said packet communication network side is changed due to movement of said first terminal,
said call control unit, in case said source IP address is to be changed, is further configured to output an instruction to change said source IP address to said packet reception unit and to output a movement completion notification to said jitter buffer unit,
said packet reception unit is further configured to receive a packet from said packet communication network, and when said source IP address is changed due to movement of said first terminal, said packet reception unit is further configured to receive a changed IP address from said control and analysis unit and to receive a packet after switching a route of a receiving node, and
said jitter buffer unit is further configured to receive a packet from said packet reception unit,
in case said first terminal moves and the IP address is changed, said jitter buffer unit is further configured to receive the movement completion notification from said control and analysis unit, said jitter buffer unit is further configured to receive a packet from said packet reception unit after clearing at least one of said jitter buffer unit, a timestamp, and a sequence number, when said movement completion notification is received,
said jitter buffer unit is further configured to output said packet from said packet reception unit to said protocol conversion unit.

8. The gateway apparatus according to claim 1, wherein:
said packet communication network includes an IMS (IP Multimedia Subsystem) network, and
said first terminal is configured to be connected to another mobile circuit switching network beyond said IMS network side.

9. The gateway apparatus according to claim 1, wherein said packet communication network is configured to include a mobile high-speed network, and
said first terminal is configured to be connected to said mobile high-speed network.

10. A communication system that comprises:
a mobile circuit switching network configured to be connected to a terminal by circuit switching;
a packet communication network configured to perform packet communication;
a gateway apparatus configured to arrange between said mobile circuit switching network and said packet communication network and including a conversion unit configured to perform a mutual conversion between a circuit switching protocol and a packet communication protocol to perform voice communication, wherein said conversion unit is further configured to exercise control such that at least one of a sequence number and a timestamp in a packet destined to a first terminal and for output to said packet communication network is configured to be made to vary continuously before and after movement of said first terminal, when said first terminal connected to said packet communication network or another network beyond said packet communication network, moves the first terminal's location, and
a call control unit configured to receive information regarding a location of said first terminal and deciding whether or not an IP address of a packet of a corresponding channel transmitted from said gateway apparatus to said packet communication network changes due to movement of said first terminal,
wherein said call control unit is further configured to:
output an instruction to change a destination IP address to said packetizing unit;

output a movement completion notification to said sequence number/timestamp changing unit, when an IP address of said packet of said corresponding channel changes, and output information on a call control signal received from said mobile circuit switching network and said packet communication network to a control and analysis unit of said conversion unit.

11. A method performed by a gateway comprising:

performing mutual conversion between a circuit switching protocol and a packet communication protocol to perform voice communication between a mobile circuit switching network and a packet communication network, said method further comprising, exercising control such that at least one of a sequence number and a timestamp in a packet destined to a first terminal and for output to said packet communication network is made to vary continuously before and after movement of said first terminal, in case said first terminal connected to said packet communication network or another network beyond said packet communication network, moves the first terminal's location, receiving information regarding location of said first terminal and deciding whether or not an IP address of a packet of a corresponding channel transmitted from a gateway apparatus to the packet communication network changes due to movement of the first terminal, outputting an instruction to change a destination IP address to said packetizing unit, outputting a movement completion notification when an IP address of said packet of said corresponding channel changes, and outputting information on a call control signal received from said mobile circuit switching network and said packet communication network.

12. The method according to claim 11, further comprising exercising control to receive a packet after clearing at least one of a reception buffer that receives said packet, a jitter buffer that eliminates a variation of delay from a received packet, the timestamp, and the sequence number, when movement of said first terminal is completed, in case said first terminal moves the first terminal's location, when said gateway receives said packet from said packet communication network and converts said packet into a circuit switching protocol frame to output the circuit switching protocol frame.

13. The method according to claim 11, further comprising exercising control such that at least one of a sequence number and a timestamp in a packet destined to said first terminal and for output to said packet communication network, is made to vary continuously before and after movement of a second terminal, in case the second terminal connected to said mobile circuit switching network performs voice communication with said first terminal and moves the second terminal's location on said mobile circuit switching network.

14. The method according to claim 13, further comprising exercising control such that a number of a frame on said circuit switching protocol destined to said second terminal and output to said mobile circuit switching network is made to vary continuously before and after movement of said second terminal, in case said second terminal connected to said mobile circuit switching network moves the second terminal's location on said mobile circuit switching network.

15. The method according to claim 12, wherein said packet communication network includes at least one of:

a mobile high-speed network and said first terminal is connected to said mobile high-speed network, and an IMS (IP Multimedia Subsystem) network and said first terminal is connected to another mobile circuit switching network on said IMS network side.

* * * * *